(12) United States Patent
Watanabe et al.

(10) Patent No.: US 6,646,044 B1
(45) Date of Patent: Nov. 11, 2003

(54) CONTINUOUS PRODUCTION METHOD OF PROPYLENE-BASED BLOCK COPOLYMER

(75) Inventors: Fuminao Watanabe, Okayama (JP); Eiji Tanaka, Okayama (JP); Jun Hosoi, Okayama (JP)

(73) Assignee: Japan Polychem Corporation, Tokyo (JP)

( * ) Notice: Subject to any disclaimer, the term of this patent is extended or adjusted under 35 U.S.C. 154(b) by 0 days.

(21) Appl. No.: 09/805,769

(22) PCT Filed: Sep. 14, 1999

(86) PCT No.: PCT/JP99/05015

§ 371 (c)(1),
(2), (4) Date: Mar. 16, 2001

(87) PCT Pub. No.: WO00/15682

PCT Pub. Date: Mar. 23, 2000

(30) Foreign Application Priority Data

Sep. 16, 1998 (JP) .......................... 10-261277
Sep. 16, 1998 (JP) .......................... 10-261278
Sep. 16, 1998 (JP) .......................... 10-261279

(51) Int. Cl.$^7$ .............................. C08F 297/08
(52) U.S. Cl. .................... 525/53; 525/243; 525/323; 526/65; 526/82; 526/84; 526/902; 526/905
(58) Field of Search .................. 525/53, 243, 323; 526/65, 82, 905, 84

(56) References Cited

U.S. PATENT DOCUMENTS

| | | | |
|---|---|---|---|
| 4,492,787 A | * | 1/1985 | Takashima et al. ............ 525/53 |
| 4,740,550 A | * | 4/1988 | Foster ........................ 525/52 |
| 4,970,280 A | * | 11/1990 | Chiba et al. ............... 525/53 X |
| 5,859,143 A | | 1/1999 | Tanaka et al. |

FOREIGN PATENT DOCUMENTS

| | | |
|---|---|---|
| JP | 55-116716 | 9/1980 |
| JP | 1-263107 | 10/1989 |
| JP | 4-296313 | 10/1992 |
| JP | 9-278847 | 10/1997 |
| JP | 9-316146 | 12/1997 |

\* cited by examiner

*Primary Examiner*—Fred Teskin
(74) *Attorney, Agent, or Firm*—Oblon, Spivak, McClelland, Maier & Neustadt, P.C.

(57) ABSTRACT

A stable continuous production of a propylene-based block copolymer can proceed for a long time without causing accumulation of particles having a small diameter by a process having the following steps: (1) polymerizing an α-olefin containing liquid propylene as a main component in the presence of hydrogen and a stereoregular polymerization catalyst in one or more polymerization reactors to obtain a polymer slurry; (2) feeding the polymer slurry to a copolymerization reactor; and (3) copolymerizing propylene and an α-olefin other than propylene substantially in a gaseous phase in the presence of the stereoregular polymerization catalyst, the polymer slurry and a deactivating compound in the copolymerization reactor to obtain a propylene-block copolymer powder. The polymer slurry, discharged from one of said one or more polymerization reactors and is classified using a classification system to obtain a) a classified polymer slurry containing a large amount of particles having a small particle diameter and b) a classified polymer slurry containing a large amount of particles having a large particle diameter. A main part of the classified polymer slurry containing a large amount of particles having a small particle diameter is recycled to a final polymerization reactor of the one or more polymerization reactors.

9 Claims, 6 Drawing Sheets

CONTINUOUS PRODUCTION METHOD OF PROPYLENE-BASED BLOCK COPOLYMER

TECHNICAL FIELD

The present invention relates to a method for continuously producing a propylene-based block copolymer, which enables the stable continuous production of a propylene-based block copolymer having an excellent impact strength for a long time.

BACKGROUND ART

As a method for improving an impact strength of crystalline polypropylene, have been known (1) a method of copolymerizing a small amount of an α-olefin; (2) a method of mechanically blending a rubber component; and (3) a method wherein a polymerization using propylene as a main component is effected, then propylene and an α-olefin other than propylene are copolymerized, namely, so-called a block copolymerization is effected.

However, it seems that in the method (1), although an improvement effect in an impact strength is fairly good, a stiffness is considerably decreased and, therefore, a balance between the stiffness and the impact strength is disadvantageously lowered. While, in the method (2), although a balance between stiffness and impact strength is improved, a rubber to be used in a blend is generally expensive, so that the method is disadvantageous in the aspect of a cost.

On the basis of the background as described above, as a method for improving an impact strength of crystalline polypropylene, (3) the method of block copolymerization is most frequently used. The block copolymerization comprises the generation of a rubbery component comprising a block of a copolymer of propylene and ethylene in the presence of a resinous component comprising a block mainly comprising propylene. Compounding of both components is effected in the subsequent polymerization and, therefore, such a subsequent polymerization is also called chemical blending and used valuably. In effecting this block copolymerization, inventors found that a propylene-based block copolymer having a decreased gel generation due to a poor dispersion of a rubber component and also having a desirable impact strength could be produced at a low cost by using a magnesium compound-deposition type highly active catalyst having a sharp particle size distribution and also using a classification system comprising a precipitating liquid classifier and a condenser, and further making an active hydrogen compound co-existent in a second polymerization step. The inventors already proposed these findings (JP-A-10-120741) (The term "JP-A" as used herein means an "unexamined published Japanese patent application).

In accordance with the present invention, there is provided a method for continuously producing a propylene-based block copolymer, which enables the stable continuous production of a propylene-based block copolymer for a long time without causing accumulation of particles having a small diameter.

DISCLOSURE OF THE INVENTION

The first gist of the present invention resides in a process for continuously producing a propylene-based block copolymer characterized by comprising a first polymerization step wherein an α-olefin comprising liquid propylene as a main component is polymerized in the presence of hydrogen and a stereoregular polymerization catalyst in one or more polymerization reactor, and a second polymerization step wherein the polymer obtained by the first polymerization step is fed to a copolymerization reactor where propylene and an α-olefin other than propylene are copolymerized substantially in a gaseous phase under the stereoregular polymerization catalyst used in the first polymerization step; and satisfying the following conditions:

(1) Most part of the slurry, discharged from the polymerization reactor in the first polymerization step, containing a large amount of particles having a small particle diameter is recycled to the initial polymerization reactor by means of a classification system;

(2) A part of the polymer slurry, discharged from the polymerization reactor in the first polymerization step and classified, containing a large amount of particles having a small particle diameter is transferred to a low pressure gas post treatment system;

(3) The polymer slurry discharged from the final polymerization reactor in the first polymerization step is transferred to the second polymerization step; and (4) The copolymerization of propylene and the α-olefin in the second polymerization step is effected in the presence of a deactivating compound.

It was found by the present inventors that a part of a slurry containing a large amount of particles having a small particle diameter in a classifier is fed to a low pressure gas post treatment system and also fed to a second polymerization step, and generating dust is made to flow out at an appropriate time and in an appropriate amount so that the accumulation of the particles having a small particle size in a reactor can be suppressed.

Particularly, as compared with a case where a slurry containing a large amount of particles having a small particle diameter is fed to the post treatment system of a low pressure gas, in a case where a slurry containing a large amount of particles having a small particle diameter is fed to a second polymerization step, there occurs a fear that a short-passed highly active catalyst generates particles containing a high rubber content, i.e., so-called an increased gel content, to result in the decrease in an impact strength. However, it was further found that by estimating an appropriate bypass amount of the catalyst, a stable production of a propylene-based block copolymer could be realized and that an unreacted high-pressure PPY could be effectively recovered. On the basis of these findings, the present invention could be completed.

The gist of the third aspect of the present invention in the above-described first embodiment of the present invention resides in the process for continuously producing a propylene-based block copolymer, wherein a part of the slurry containing a large amount of particles having a small diameter is fed to the post treatment system of a low pressure gas and the second polymerization step.

Further, the present invention could be achieved on the basis of the founding as set forth below: Namely, the reactor in the first polymerization step is converted to two reactors which are connected in series, whereby even in a propylene-based block polymer having a further higher rubber content and a further higher molecular weight, small amount of gel formation and a desirable impact strength can be maintained. Further, a polymer amount load to one polymer reactor can be reduced so that respective reactors can be made small. Therefore, in a production plant which is desired to be enlarged, the size of respective reactors can have a size within a production limit.

Namely, the gist of fourth aspect of the present invention resides in a process for continuously producing a propylene-based block copolymer characterized by comprising a first polymerization step wherein an α-olefin comprising liquid propylene as a main component is polymerized in the presence of hydrogen and a stereoregular polymerization catalyst in two polymerization reactors, and a second polymerization step wherein the polymer obtained by the first polymerization step is fed to a copolymerization reactor where propylene and an α-olefin other than propylene are copolymerized substantially in a gaseous phase under the stereoregular polymerization catalyst used in the first polymerization step; and satisfying the following conditions:

(1) The polymer slurry discharged from the first polymerization reactor in the first polymerization step is classified by means of a classification system into a slurry containing a large amount of particles having a large particle diameter and a slurry containing a large amount of particles having a small particle diameter, and the slurry containing a large amount of particles having a large particle diameter is fed to the second polymerization reactor, while most part of the slurry containing a large amount of particles having a small particle diameter is recycled to the first polymerization reactor;

(2) A part of the polymer slurry, discharged from the first polymerization reactor in the first polymerization step and classified, containing a large amount of particles having a small particle diameter is fed to the post-treatment system of a low pressure gas;

(3) The polymer slurry discharged from the second Polymerization reactor in the first polymerization step is transferred to the second polymerization step; and (4) The copolymerization of propylene and the α-olefin in the second polymerization step is effected in the presence of a deactivating compound.

The gist of the sixth aspect of the present invention in the above-described fourth embodiment of the present invention resides in the process for continuously producing a propylene-based block copolymer, wherein a part of the slurry discharged from the first polymerization reactor in the first polymerization step and classified, containing a large amount of particles having a small diameter is transferred to the second polymerization reactor.

The gist of the seventh aspect of the present invention in the above-described fourth embodiment of the present invention resides in the process for continuously producing a propylene-based block copolymer, wherein the ratio of the polymerization in the first polymerization reactor and that of the second polymerization reactor (first polymerization reactor/second polymerization reactor) in the first polymerization step is 35/65 to 99/1.

The gist of the eight aspect of the present invention resides in a process for continuously producing a propylene-based block copolymer characterized by comprising a first polymerization step wherein an α-olefin comprising liquid propylene as a main component is polymerized in the presence of hydrogen and a stereoregular polymerization catalyst in two polymerization reactors, and a second polymerization step wherein the polymer obtained by the first polymerization step is fed to a copolymerization reactor where propylene and an α-olefin other than propylene are copolymerized substantially in a gaseous phase under the stereoregular polymerization catalyst used in the first polymerization step; and satisfying the following conditions:

(1) The polymer slurry discharged from the first polymerization reactor in the first polymerization step is transferred to the second polymerization reactor;

(2) The polymer slurry discharged from the second polymerization reactor in the first polymerization step is classified by means of a classification system including a classifier into a slurry containing a large amount of particles having a large particle diameter and a slurry containing a large amount of particles having a small particle diameter, and the slurry containing a large amount of particles having a large particle diameter is fed to the second polymerization step, while most part of the slurry containing a large amount of particles having a small particle diameter is recycled to the second polymerization reactor;

(3) A part of the polymer slurry, discharged from the second polymerization reactor in the first polymerization step and classified, containing a large amount of particles having a small particle diameter is fed to a low pressure gas post treatment system; and (4) The copolymerization of propylene and the α-olefin in the second polymerization step is effected in the presence of a deactivating compound.

The gist of the tenth aspect of the present invention in the above-described eighth embodiment of the present invention resides in the process for continuously producing a propylene-based block copolymer, wherein a part of the slurry discharged from the second polymerization reactor in the first polymerization step and classified, containing a large amount of particles having a small diameter is transferred to the second polymerization step.

The gist of the eleventh aspect of the present invention in the above-described eighth embodiment of the present invention resides in the process for continuously producing a propylene-based block copolymer, wherein the ratio of the polymerization in the first polymerization reactor and that of the second polymerization reactor (first polymerization reactor/second polymerization reactor) in the first polymerization step is 15/85 to 85/15.

THE MOST PREFERABLE EMBODIMENT FOR EFFECTING THE PRESENT INVENTION

Figure 1A:
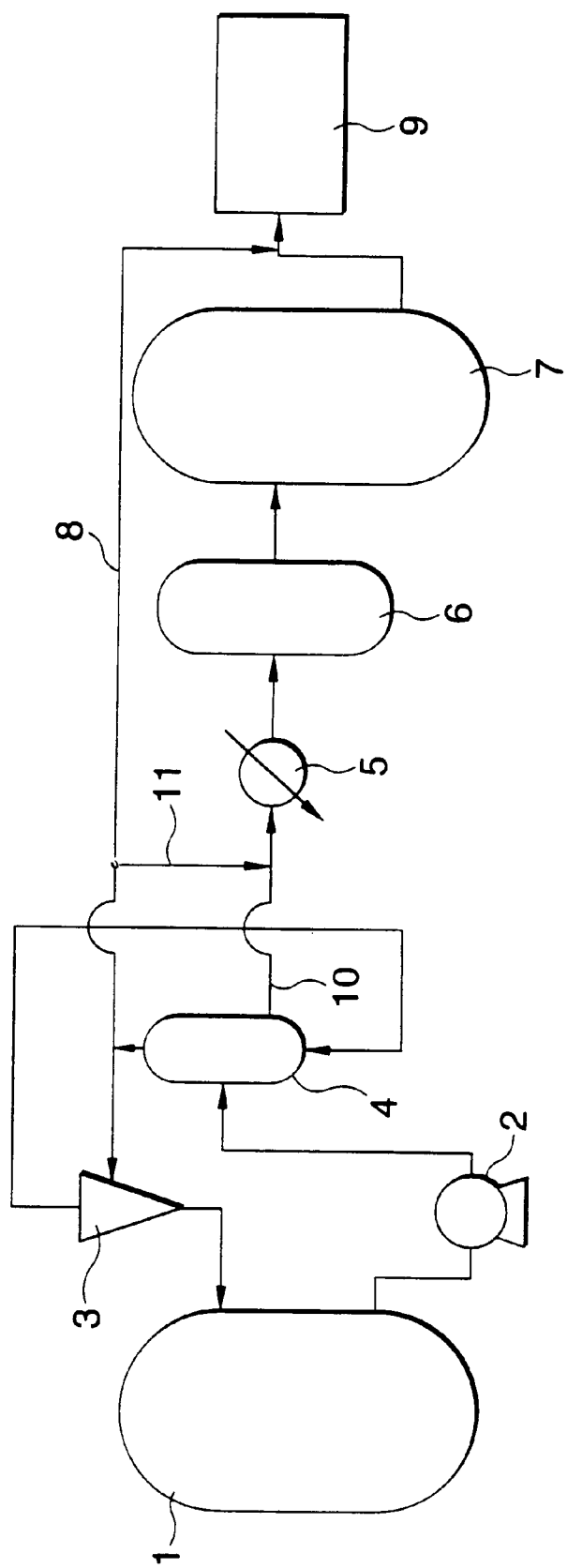
FIG. 1(a) is a flow diagram showing second embodiment of the present invention.

In the polymer reactor in the first polymerization step, polymerization using propylene as a main component is effected. Namely, homopolymerization of propylene or copolymerization of propylene and a small amount of an α-olefin (including ethylene) is effected. As the α-olefin in case of effecting copolymerization, mention may be made of those having 2 to 18 carbon atoms, particularly 2 to 8 carbon atoms, such as ethylene, 1-butene, 1-hexene and 1-octene. Among these compounds, ethylene and 1-butene are preferable.

Generally, with increasing the copolymerization amount of this α-olefin, transparency and whitening resistance of the block copolymer are correspondingly improved. However, if the copolymerization amount is too large, stiffness and thermal resistance of a molded product are deteriorated. Therefore, generally, a proportion of the α-olefin in the polymerization amount in the first polymerization step is 5% by weight or less, preferably 3% by weight or less.

The polymerization in this first polymerization step is effected by continuously supplying a stereoregular catalyst or respective components constituting the same, e.g., a solid catalyst component, a co-catalyst, optionally an electron-donating compound or a catalytic compound thereof, and a monomer, i.e., propylene, optionally, an α-olefin other than propylene and hydrogen.

As the stereoregular catalyst of the present invention, can be used those comprising a solid catalyst component, an organic aluminum compound and optionally an electron-donating compound, or those comprising a solid catalyst and an activating agent other than an organic aluminum compound. The expression "comprising" means that various components other than the above-described main component are also included. These various components are those which can be used as in the main component.

Among these stereoregular catalysts, those comprising a solid catalyst component, an organic aluminum compound and optionally an electron-donating compound have been conventionally known (e.g., JP-A-56-811; JP-A-58-83006; JP-A-4-218507; JP-A-6-25338; JP-A-57-63311; JP-A-61-213208; JP-A-62-187706; JP-A-5-331233; JP-A-5-331234; JP-A-63-289004; JP-A-1-319508; JP-A-52-98706; JP-A-1-54007 and JP-A-3-72503).

As the above-described solid catalyst component, can be used those comprising magnesium, titanium, a halogen and an electron donating compound.

Examples of magnesium in the solid catalyst component include magnesium halides such as magnesium chloride, magnesium bromide, magnesium iodide and magnesium fluoride; alkoxymagnesium halides such as methoxymagnesium chloride, ethoxymagnesium chloride, isopropoxymagnesium chloride, butoxymagnesium chloride, hexoxymagnesium chloride and octoxymagnesium chloride; aryloxymagnesium halides such as phenoxymagnesium chloride and methylphenoxymagnesium chloride; alkoxy magnesium such as methoxy magnesium, ethoxy magnesium, isopropoxy magnesium, n-butoxy magnesium, n-octoxy magnesium and 2-ethylhexoxy magnesium; aryloxy magnesium such as phenoxy magnesium and methylphenoxy magnesium; and carboxylates of magnesium such as magnesium laurate and magnesium stearate. These magnesium compounds can be used alone or in any mixture thereof.

Titanium in the solid catalyst component is usually introduced from a tetra-valent titanium compound generally represented by Ti $(OR)_9X_{4-g}$ (R represents a hydrocarbon group, X represents a halogen, and g is $0 \leq g \leq 4$), specifically, titanium tetrahalides such as $TiCl_4$, $TiBr_4$ and $TiI_4$; alkoxy titanium trihalides such as $Ti(OCH_3)Cl_3$, $Ti(OC_2H_5)$ $Cl_3$, $Ti(O-n-C_4H_9)$ $Cl_3$, $Ti(O-i-C_4H_9)$ $Cl_3$, $Ti(OCH_3)Br_3$, $Ti(OC_2H_5)Br3$, $Ti(O-n-C_4H_9)Br_3$ and $Ti(O-i-C_4H_9)Br_3$; alkoxy titanium dihalides such as $Ti(OCH_3)_2Cl_2$, $Ti(OC_2H_5)_2Cl2$, $Ti(O-n-C_4H_9)_2Cl_2$, $Ti(O-i-C_4H_9)_2Cl_2$, $Ti(OCH_3)_2Br_2$, $Ti(OC_2H_5)_2Br_2$, $Ti(O-n-C_4H_9)_2Br_2$ and $Ti(O-i-C_4H_9)_2Br_2$; alkoxy titanium monohalides such as $Ti(OCH_3)_3Cl$, $Ti(OC_2H_5)_3Cl$, $Ti(O-n-C_4H_9)_3Cl$, $Ti(O-i-C_4H_9)_3Cl$ and $Ti(OCH_3)_3Br$, $Ti(OC_2H_5)_3Br$, $Ti(O-n-C_4H_9)_3$ Br and $Ti(O-i-C_4H_9)_3Br$; tetraalkoxy titanium such as $Ti(OCH_3)_4$, $Ti(OC_2H_5)_4$ $Ti(O-n-C_4H_9)_4$ and $Ti(O-i-C_4H_9)_4$; or mixtures of these compounds, or mixtures of these compounds with aluminum compounds, silicon compounds, sulfur compounds, other metal compounds, hydrogen halides or halogens. While, a halogen is usually introduced from the above-described tetra-valent titanium compound represented by $Ti(OR)_9X_{4-g}$ (R represents a hydrocarbon group, X represents a halogen, arid g is $0 \leq g \leq 4$), hydrogen halides or halogens.

As the electron-donating compound in the solid catalyst component, generally known compounds used in the production of such a kind of solid catalyst component can be used. Generally, oxygen-containing compounds and/or nitrogen-containing compounds are preferably used. As the oxygen-containing compounds, generally ethers, ketones, esters and alkoxysilanes can be mentioned. As the nitrogen-containing compounds, amines, amides and nitroso compounds can be mentioned.

As the organic aluminum compound which is a co-catalyst of the stereoregular catalyst, any organic aluminum compound can be used as long as they can be used for the same object as that of the stereoregular catalyst. As the organic aluminum compound, specifically mention may be made of (i) trialkyl aluminum, for example, those wherein each alkyl group has 1 to 12 carbon atoms, such as trimethyl aluminum, triethyl aluminum, tri-n-propyl aluminum, tri-isobutyl aluminum, trihexyl aluminum, trioctyl aluminum, tridecyl aluminum and tridodecyl aluminum, (ii) halogen-containing organic aluminum compounds, specifically those obtained by substituting one or two of alkyl groups in the above-described trialkyl aluminum with a halogen such as chlorine or bromine, for example, diethylaluminum chloride and sesquialuminum chloride, (iii) hydride-containing organic aluminum compounds, specifically those obtained by substituting one or two of alkyl groups in the above-described trialkyl aluminum with hydrogen, for example, diethylaluminum hydride, (iv) alkoxide-containing aluminum compounds, specifically those obtained by substituting one or two of alkyl groups in the above-described trialkyl aluminum with an alkoxy group (including an aryloxy group) having, particularly, about 1 to 8 carbon atoms, for example, dimethylaluminum methoxide, diethylaluminum methoxide and diethylaluminum phenoxide, (v) an aluminoxane (also referred to as alumoxane), specifically an alkylaminoxane wherein the alkyl group has 1 to 12 carbon atoms, for example, methyl aluminoxane, ethyl aluminoxane and isobutyl aluminoxane. As the organic aluminum compound, plural compounds in the same-group and/or plural compounds selected from these plural groups can be used.

A use amount of the organic aluminum compounds is not particularly limited. Usually, the organic aluminum compound is used in such an amount that a molar ratio of aluminum in the organic aluminum compound and titanium in the solid catalyst component may be 0.1 to 10000, preferably 10 to 5000, more preferably 50 to 2000.

As the electron-donating compound optionally used as an external donor, those used in this kind of stereoregular catalyst can be used In the present invention, oxygen-containing compounds and/or nitrogen-containing compounds can be mentioned as preferable electron-donating compounds.

As the nitrogen-containing compounds, mention may be made of amines such as triethyl amine, ethylenediamine, diisopropylamine, di-t-butylamine, pyridine, piperidine, 2,2, 6,6-tetramethylpiperidine and the derivatives thereof, tertiary amine, and nitroso compounds such as n-oxides of pyridines and quinolines.

As the oxygen-containing compounds, generally mention may be made ethers, ketones, esters and alkoxysilanes.

As (i) ethers, mention may be made of those wherein a hydrocarbon residue to be bonded with an ether oxygen comprises about 2 to 18 carbon atoms, preferably about 4 to 12 carbon atoms in total, and an ether oxygen is included therein, such as diethyl ether, dipropyl ether, diethylene glycol dimethyl ether, propylene glycol dimethyl ether, ethylene oxide, tetrahydrofuran, 2,2,5,5-tetramethyltetrahydrofuran and dioxane, as (ii) ketones, mention may be made of those wherein a hydrocarbon residue to be bonded with a ketone carbonyl group comprises about 2 to 18 carbon atomes, preferably about 4 to 12 carbon atoms in total, such as acetone, diethyl ketone, methylethyl ketone and acetophenone, as (iii) esters, mention may be made of those comprising, as a carboxylic acid part, an aryl or an aralkyl carboxylic acid wherein the aryl group or the aryl part is preferably a phenyl or a lower (about $C_1$ to $C_4$) alkyl and/or a lower (about $C_1$ to $C_4$) alkoxy-substituted phenyl, the alkyl part of the aralkyl group preferably comprises about 1 to 6 carbon atoms, and the number of carboxyl group is preferably 1 to 3; or an aliphatic carboxylic acid wherein a part other than the carboxyl groups (about 1 to 3) comprises about 1 to 20 carbon atoms, preferably 2 to 12 carbon atoms and may comprise an ether oxygen; and an alcohol part having about 1 to 8 carbon atoms, preferably about 1 to 4 carbon atoms, and also mention may be made of inner esters of hydroxy-substituted derivatives corresponding to the above-described carboxylic acid, e.g., phenylethyl, acetate, methyl benzoate, ethyl benzoate, phenyl benzoate, methyl toluate, ethyl toluate, methyl anisate, ethyl anisate, methyl methoxybenzoate, ethyl methoxybenzoate, methyl methacrylate, ethyl methacrylate, dimethyl phthalate, diethyl phthalate, dipropyl phthalate, dibutyl phthalate, diisobutyl phthalate, dihexyl phthalate, γ-butyrolactone and ettiylcellosolve, as (iv) alkoxysilanes, mention may be made of those having at least one alkoxy group (including an aryloxy group, and preferably having about 1 to 18 carbon atoms, in particular, about 1 to 4 carbon atoms) and also having an alkyl, aryl or aralkyl group (general explanation thereof is the same as those as described above) as the remaining valence of the silicon atom, specifically, tetramethoxysilane, ethyltrimethoxysilane, n-propyltrimethoxysilane, isopropyltrimethoxysilane, t-butyltrimethoxysilane, phcnyltrimethoxysilane, cyclohexyltrimethoxysilane, 1-methylcyclohexyltrimethoxysilane, 1,1,2,2-tretramethylpropyltrimethoxysilane, diethyldimethoxysilane, di-n-propyldimethoxysilane, diisopropyldimethoxysilane, diphenyldimethoxysilane, t-butylmethyldimethoxysilane, t-butylethyldimethoxysilane, t-butyl-n-propyldimethoxysilane, t-butylisopropyldimethoxysilane, cyclohyxylmethyldimethoxysilane, dicyclohyxyldimethoxysilane, 1-methylcyclohyxylmethyldimethoxysilane, 1,1,2,2-tetramethylpropylmethyldimethoxysilane, ethyltriethoxysilane, n-propyltriethoxysilane, isopropyltriethoxysilane, t-butyltrimethoxysilane, phenyltriethoxysilane, cyclohexyltriethoxysilane, 1-methylcyclohexyltriethoxysilane, 1,1,2,2-tetramethylpropyl triethoxysilane, diethyldiethoxysilane, di-n-propyldiethoxysilane, diisopropyldiethoxysiiane, diphenyldiethoxysilane, t-butylmethyldicthoxysilane, t-butylethyldiethoxysilane, t-butyl-n-propyldiethoxysilane, cyclohyxylmethyldiethoxysilane, cyclohexylethyldiethoxysilane, 1-methylcyclohyxylmethyl diethoxysilane, and 1,1,2,2-tetramethylpropylmethyl diethoxysilane.

Among these compounds, pyridines or alkoxysilanes are preferably used, and alkoxysilanes are particularly preferably used.

A use amount of these compounds are not particularly limited. However, they are used in an amount of 0 to 10, preferably 0 to 2 in terms of a molar ratio to aluminum in an organic aluminum compound to be used as a co-catalyst. As the electron-donating compound, plural compounds in the same group and/or plural compounds selected from these plural groups can be used.

As other stereoregular catalysts to be used in the present invention, can be used catalysts comprising a solid catalyst component wherein so-called metallocene complex is deposited on a fine-particulate carrier, in combination with an organic aluminum compound or an activating agent other than an organic aluminum compound. As the solid catalyst using the metallocene complex to be used in the present invention, are used those showing 90% or more of the value of [mmmm] in the $C_{13}$NMR determination of propylene polymer.

As such a catalyst, mention may be made of JP-A-6-239914; JP-A-8-059724; JP-A-8-085708; JP-A-8-183814; JP-A-6-100579; JP-A-6-184179; JP-A-7-224079; and JP-A-8-067689.

A catalyst is prepared by using a solid catalyst component comprising metallocene complex deposited thereon alone; a combination of the solid catalyst component with an organic aluminum; or a combination of the solid catalyst component, an aluminumoxy compound or an ionic compound or Lewis acid which can convert the metallocene complex to the cation by reacting with the metallocene complex.

Metallocene complex used as component (A) in the present invention is preferably those represented by the general formula (I):

(I)

(in the formula, $A^1$ and $A^2$ represent a conjugated five-membered ring ligand which may be substituted (in the same compound, $A^1$ and $A^2$ may be the same or different); Q represents a bonding group crosslinking two conjugated five-membered ring ligands at an optional position; M represents a metal atom selected from groups 4 to 6 of the periodic table; X and Y each independently represents a hydrogen atom, a haloqen atom, a hydrocarbon group, an amino group, a halogenated hydrocarbon group, an oxygen-containing hydrocarbon group, a nitrogen-containing hydrocarbon group, a phosphorous-containing hydrocarbon group or a silicon-containing hydrocarbon group.) Further, such a metallocene complex is also preferable that $A^1$ and $A^2$ represent a conjugated five-membered ring ligand (in the same compound, $A^1$ and $A^2$ may be the same or different), at least one of them has a 7 to 10-membered condensing ring (e.g., benzene ring or naphthalene ring) including two atoms of the conjugated five-membered ring ligand formed by bonding adjacent substituents on the conjugated five-membered ring ligand; Q represents a bonding group crosslinking two conjugated five-membered ring ligands at an optional position; M represents a metal atom selected from groups 4 to 6 of the periodic table; X and Y each independently represents a hydrogen atom, a halogen atom, a hydrocarbon group, an amino group, a halogenated hydrocarbon group, an oxygen-containing hydrocarbon group, a nitrogen-containing hydrocarbon group, a phosphorous-containing hydrocarbon group or a silicon-containing hydrocarbon group.

As these metallocene complexes, mention may be made of dimethylsilylenebis{1,1'-(2-methyl-4-phenyl-4-hydroazulenyl)}zirconium dichloride, dimethylsilylenebis{1,1'-(2-ethyl-4-phenyl-4-hydroazulenyl)}zirconium dichloride, dimethylsilylenebis{1,1'-(2-methyl-4-phenyl-4-hydroazulenyl)}hafnium dichloride, dimethylgelmylenebis{1,1'-(2-methyl-4-phenyl-4-hydroazulenyl)}zirconium dichloride, dimethylsilylenebis[1,1'-{2-methyl-4-(4-chiorophenyl)-4-hydroazulenyl}] zirconium dichloride, dimethylsilylenebis[1,1'-{2-methyl-4-(4-chlorophenyl)-4-hydroazulenyl)}hafnium dichloride, dimethylsilylenebis[1,1'-{2-methyl-4-(4-trifluoromethylphenyl)-4-hydroazulenyl}]zirconium dichloride, dimethylsilylenebis[1,1'-{2-methyl-4-(3-chlorophenyl)-4-hydroazulenyl}]hafnium dichloride, dimethylsilylenebis{1,1'-(2-methyl-4-phenyl-7-isopropyl-4-hydroazulenyl}zirconium dichloride, dimethylsilylenebis{1,1'-2-benzyl-4-phenyl-4-hydroazulenyl}zirconium dichloride, dimethylsilylenebis{1,1'-(2-benzyl-4-phenyl-7-isopropyl-4-hydroazulenyl}zirconium dichloride, dimethylsilylenebis(1,1'-(2-methyl-4,5-benzoindenyl) zirconium dichloride, dimethylsilylenebis(1,1'-(2-methyl-5-phenylindenyl) zirconium dichloride, and dimethylsilylenebis(1,1'-(2-methyl-5-naphthylindenyl) zirconium dichloride.

As a fine particulate carrier to be used for the preparation of a solid catalyst, an ion-exchangeable layered compound, an inorganic silicate, a metal oxide or a composite oxide, which are in the form of fine particles generally having a particle diameter of 5 µm to 5 mm, preferably 10 µm to 2 mm can be used As the above-described ion-exchangeable layered compound, mention may be made of ion crystalline compounds having a crystal structure in the form of a layer such as hexagonal closest packing type, antimony type, $CdCl_2$ type or $CdI_2$ type. Specific examples thereof include crystalline acidic salts of multivalent metals such as α-Zr $(HAsO_4)_2.H_2O$, α-Zr$(HPO_4)_2$, α-Zr$(KPO_4)_2.3H_2O$, α-Ti $(HPO_4)_2$, α-Ti$(HAsO_4)_2.H_2O$, α-Sn$(HPO_4)_2.H_2O$, γ-Zr $(HPO_4)_2$, γ-Ti$(HPO_4)_2$ and γ-Ti$(NH_4PO_4)_2.H_2O$.

The above-described ion-exchangeable layered compound can be subjected to a salt treatment and/or an acid treatment depending upon a necessity prior to utilization. An ion-exchangeable layered compound except for a silicate, which has not been subjected to a salt treatment and/or an acid treatment, is a compound having a crystal structure wherein constructing planes are piled in parallel with each other by a weak bonding force such as an ionic bond and included ions can be exchanged with each other.

As the above-described inorganic silicate, mention may be made of clay, clay mineral, zeolite and diatomaceous earth. They can be synthesized products or naturally-produced minerals. Specific examples of the clay and the clay mineral include allophane group such as allophane; kaolin group such as dickite, nacrite, kaolinite and anauxite; halloysite group such as emetahalloysite and halloysite; serpentine group such as chrysotile, lizardite and antigorite; smectite such as montmorillonite, sauconite, beidellite, nontronite, saponite and hectrite; vermiculite mineral such vermiculite; mica mineral such as illite, cericite and glauconite; attapulgite, sepiolite, palygorskite, bentonite, Kibushi clay, Gairome clay, hisingerite, pyrophillite, and chlorite. These substances can form a mixed layer. Further as artificial synthesized products, mention may be made of synthetic mica, synthetic hectrite, synthetic saponite and synthetic taeniolite.

Among the above-described inorganic silicates, kaolin group, halloysite group, serpentine group, smectite, vermiculite mineral, mica mineral, synthetic mica, synthetic hectrite, synthetic saponite, and synthetic taeniolite are preferable, and smectite, vermiculite mineral, synthetic mica, synthetic hectrite, synthetic saponite and synthetic taeniolite are more preferable. They can be used as they are without being subjected to a particular treatment, or can be used after having been subjected to a treatment such as ball milling or sifting. They can be used alone or in any mixture thereof.

In the above-described ion-exchangeable layered compounds and inorganic silicates, an acid strength of the solid can be changed by a salt treatment and/or an acid treatment. While the salt treatment forms an ion composite, a molecule composite and an organic derivative, whereby the surface area and the distance between the layers can be changed. Namely, by utilizing an ion-exchangeable property, ion-exchangeable ions present between layers are substituted with other large and bulky ions so that a laminated material wherein the distance between layers is enlarged can be obtained.

In a compound which has not been subjected to the above-described pretreatment, included ion-exchangeable metal cations are preferably ion-exchanged with cations dissociated from the salts and/or acids described below.

A salt to be used for the above-described ion-exchange is a compound including a cation comprising at least one kind of atom selected from a group consisting of atoms of 1 to 14 group, preferably a compound comprising a cation comprising at least one kind of atom selected from a group consisting of atoms of 1 to 14 group and an anion derived from an atom or an atomic group selected from a group consisting of a halogen atom, an inorganic acid and an organic acid, more ,preferably a compound comprising a cation comprising at least one kind of atom selected from a group consisting of atoms of 2 to 14 group and at least one anion selected from a group consisting of Cl, Br, I, F, $PO_4$, $SO_4$, $NO_3$, $CO_3$, $C_2O_4$, $ClO_4$, $OOCCH_3$, $CH_3COCHCOCH_3$, $OCl_2$, $O(NO_3)_2$, $O(ClO_4)_2$, $O(SO_4)$, OH, $O_2Cl_2$, $OCl_3$, OOCH and $OOCCH_2CH_3$. Two or more kinds of these salts can be used simultaneously. An acid to be used for the above-described ion-exchange is preferably selected from a group consisting of hydrochloric acid, sulfuric acid, nitric acid, acetic acid and oxalic acid. They can be used in any mixture thereof. As a method comprising a combination of a salt treatment and an acid treatment, mention may be made of a method wherein an acid treatment is effected after effecting a salt treatment; a method wherein a salt treatment is effected after effecting an acid treatment; and a method wherein a salt treatment and an acid treatment are simultaneously effected. It should be noted that an acid treatment is effective in ion exchange and elimination of impurities and also effective in elution of a part of cations such as Al, Fe, Mg and Li in a crystal structure.

Treatment conditions with a salt and an acid are not particularly limited. However, generally, for a salt and an acid, a concentration of 0.1 to 30% by weight, a treatment temperature of room temperature to a boiling point of a solvent to be used, and a treatment time of 5 minutes to 24 hours are selected, then a treatment is preferably effected under such a condition that at least a part of a compound to be treated is eluted. It should be noted that a salt and an acid are generally used in the form of an aqueous solution.

In a case where the above-described salt treatment and/or acid treatment are(is) effected, grinding or granulation can be effected for controlling a shape before, during or after the treatment. Further other treatments such as an alkali treatment and an organic treatment can be used together with the salt treatment and/or acid treatment. As component (B) thus obtained, a volume of pores having a radius of 20 Å or more determined by mercury injection method is 0.1 cc/g or more, preferably 0.3 to 5 cc/g. Component (B) usually includes adsorbed water and interlaminar water. The adsorbed water herein means is water adsorbed on the surface or on the broken crystal surface of an ion-exchangeable layered compound or an inorganic silicate, thereof. While, the interlaminar water is water present between layers of a crystal.

In the present invention, component (B) is preferably used after eliminating adsorbed water and interlaminar water as described above. A dehydration method is not particularly limited. A thermal dehydration, a thermal dehydration under the flow of a gas stream, a thermal dehydration under a reduced pressure and an azeotropic dehydration with an organic solvent are used. As a heating temperature, such a temperature is selected that adsorbed water and interlaminar water do not remain. Generally, it is 100° C. or more, preferably 150° C. or more. However, a high temperature condition which may cause a structure destruction is not desirable. A heating time is 0.5 hours or more, preferably 1 hour or more. In such a case, a weight loss of component (B) after dehydrated and dried, specifically, after effecting suction at a temperature of 200° C., under a pressure of 1 mmHg for 2 hours, is preferably 3% by weight or less. In the present invention, in a case where component (B) wherein a weight loss is arranged to 3% by weight or less is used, component (B) is preferably handled so as to keep the same weight loss in contacting with component (A) and component (B) described below.

As the inorganic oxide and the composite oxide, for example, mention may be made of oxides such as $SiO_2$, $Al_2O_3$, MgO, ZrO, $TiO_2$, $B_2O_3$ and ZnO; and composite oxides such as $SiO_2$—MgO, $SiO_2$—$Al_2O_3$, $SiO_2$—$TiO_2$, $SiO_2$—$Cr_2O_3$ and $SiO_2$—$Al_2O_3$—MgO.

Next, as an organic aluminum compound (component (C)), the aforementioned compounds can be used. Specific examples thereof include trialkyl aluminum such as trimethyl aluminum, triethyl aluminum, tripropyl aluminum. and triisobutyl aluminum; and halogen or alkoxy-containing alkyl aluminum such as diethyl aluminum monochloride and diethyl aluminum monomethoxide. Among these compounds, trialkyl aluminum is preferable.

Further, as the organic aluminum compound (component (C)), an aluminumoxy compound can be used, i.e., specifically a compound which is also called an alumoxane. The compound is obtained by reacting one kind of trialkyl aluminum or two or more kinds of trialkyl aluminum with water. Specifically, can be exemplified (a) compounds obtained from one kind of trialkyl aluminum and water, i.e., methylalumoxane, ethylalumoxane, propylalumoxane, butylalumoxane and isobutylalumoxane; and (b) compounds obtained from two kinds of trialkyl aluminum and water, i.e., methylethyl alumoxane, methylbutyl alumoxane and methylisobutyl alumoxane. Among these compounds, methylalumoxane and methylisobutyl alumoxane are preferable.

As the above-described alumoxane, plural compounds in the same group and/or plural compounds selected from these plural groups can be used.

As an ionic compound which can react with metallocene complex to convert the same to the cation, a compound represented by the general formula (II) can be mentioned.

$$[K]^{e+}[Z]^{e-} \tag{II}$$

In the general formula (II), K is a cation component. Examples of the same include carbonium cation, tripyrium cation, ammonium cation, oxonium cation, sulfonium cation and phosphonium cation. Further, a cation of a metal and a cation of an organic metal which themselves are readily reduced can be mentioned.

As the specific examples of the above-described cation include triphenyl carbonium, diphenyl carbonium, cycloheptatrienium, indenium, triethyl ammonium, tripropyl ammonium, tributyl ammonium, N,N-dimethyl anilinium, dipropyl ammonium, dicyclohexyl ammonium, triphenyl phosphonium, trimethyl phosphonium, tris(dimethylphenyl) phosphonium, tris(methylphenyl)phosphonium, triphenyl sulfoniunm, triphenyl oxonium, triethyl oxonium, pyrilium, silver ion, gold ion, platinum ion, copper ion, palladinium ion, mercury ion and pherrocenium ion.

In the above-described general formula (II), Z represents an anion component, and is to be a counter anion to a cation species formed by the conversion of component (A) (gencrally, non-coordinating compound). As Z, mention may be made of an organic boron compound anion, an organic aluminum anion, an organic gallium compound anion, an organic phosphorus compound anion, an organic arsenic compound anion and an organic antimony compound anion. Specific examples thereof include (a) tetraphenyl boron, tetrakis(3,4,5-trifluorophenyl)boron, tetrakis{3,5-bis(trifluoromethyl)phenyl}boron, tetrakis{3,5-di(t-butyl)phenyl}boron, tetrakis{pentafluorophenyl}boron;. (b) tetraphenyl aluminum, tetrakis3,4,5-trifluorophenyl)aluminum, tetrakis{3,5-bis(trifluoromethyl)phenyl}aluminum, tetrakis{3,5-di(t-butyl)phenyl}aluminum, tetrakis{pentafluorophenyl}aluminum; (c) tetraphenyl gallium, tetrakis(3,4,5-trifluorophenyl)gallium, tetrakis{3,5-bis(trifluoromethyl)phenyl}gallium, tetrakis{3,5-di(t-butyl)phenyl}gallium, and tetrakis-{pentafluorophenyl}gallium; (d) phosphorus tetraphenyl, phosphorus tetrakis(pentafluorophenyl), (e) arsenic tetraphenyl, arsenic tetrakis(pentafluorophenyl); (f) tetraphenyl antimony, tetrakis(pentafluorophenyl)antimony; (g) decaborate, undecaborate, carbadodecaborate and decahlorodecaborate.

As a Lewis acid, particularly, a Lewis acid capable of converting a metalloceno complex to cation, various kinds of organic boron compounds, metal halide compounds and solid acids are exemplified. Specific examples thereof include (a) organic boron compounds such as triphenyl boron, tris(3,5-difluorophenyl)boron and tris (pentafluorophenyl)boron; (b) metal halide compounds such as aluminum chloride, aluminum bromide, aluminum iodide, magnesium chloride, magnesium bromide, magnesium iodide, magnesium bromide chloride, magnesium iodide chloride, magnesium iodide bromide, magnesium hydride chloride, magnesium hydroxide chloride, magnesium hydroxide bromide, magnesium alkoxide chloride, and magnesium alkoxide bromide; and (c) solid acids such as C alumina and silica-alumina, e.g., oxides such as $SiO_2$, $Al_2O_3$, MgO, ZrO, $TiO_2$, $B_2O_3$ and ZnO; and composite oxides such as $SiO_2$—MgO, $SiO_2$—$Al_2O_3$, $SiO_2$—$TiO_2$, $SiO_2$—$Cr_2O_3$ and $SiO_2$—$Al_2O_3$—MgO.

A solid catalyst component, an organic aluminum compound or optionally used an electron-donating compound, and an activating agent other than the organic aluminum compound are contacted with each other inside or outside a polymerization reactor in the presence or absence of a monomer to be polymerized, whereby the stereoregular catalyst of the present invention is formed.

Each catalyst component can be independently supplied to a polymerization reactor. Alternatively, respective optional components are contacted with each other, then supplied. In this case an optional contacting method can be employed. Namely, respective components can be contacted at the same time, or optional respective components can be successively contacted. A method for supplying these respective components is not particularly limited. These components can be supplied after being dissolved or dispersed in an inert hydrocarbon solvent such as propane, butane, pentane, hexane heptane, octane, nonane, decane toluene and xylene. Substantially, respective components can be directly supplied without using these inert hydrocarbon solvents.

Embodiments of a method for continuously producing a propylene-based block copolymer of the present invention will be described below.

First embodiment of a method for continuously producing a propylene-based block copolymer of the present invention is as follows: A process for continuously producing a propylene-based block copolymer characterized by comprising a first polymerization step wherein an α-olefin comprising liquid propylene as a main component is polymerized in the presence of hydrogen and a stereoregular polymerization catalyst in one or more polymerization reactor, and a second polymerization step wherein the polymer obtained by the first polymerization step is fed to a copolymerization reactor where propylene and an α-olefin other than propylene are copolymerized substantially in a gaseous phase under the stereoregular polymerization catalyst used in the first polymerization step; and satisfying the following conditions:

(1) Most part of the slurry, discharged from the polymerization reactor in the first polymerization step, containing a large amount of particles having a large particle diameter is recycled to the initial polymerization reactor by means of a classification system;

(2) A part of the polymer slurry, discharged from the polymerization reactor in the first polymerization step and classified, containing a large amount of particles having a small particle diameter is transferred to a low pressure gas post treatment system;

(3) The polymer slurry discharged from the final polymerization reactor in the first polymerization step is transferred to the second polymerization step; and (4) The copolymerization of propylene and the α-olefin in the second polymerization step is effected in the presence of a deactivating compound.

With referring to FIG. 1, second embodiment of the present invention will be described in more detail below.

The first polymerization step is effected in the first step polymerization reactor 1. In the polymerization in the first step polymerization reactor 1, is employed a polymerization method using liquid propylene as a medium. The polymerization method using propylene itself as a medium can provide a high catalytic efficiency in a short time in the first polymerization step to be advantageous in view of cost, and the method is further advantageous in the point that a wet classification (detail will be described later) can be adopted. It should be noted that the wet classification generally can provide a high classification efficiency as compared with a case employing a dry classification. Therefore, the wet classification is advantageous in suppressing a short-pass in the first polymerization step. Further, a wet classification by means of a precipitating liquid classifier 4 is suitable for the present invention. In this case, liquid propylene can be used as a medium for classification and, therefore, the utilization of another medium is not required to be used, which is an advantageous point in the wet classification. Still further, the method is also advantageous in that the separation of a polymer from unreacted propylene can be readily effected.

In the present invention, a polymerization temperature in the first polymerization step is not particularly limited. However, a polymerization is usually effected at a temperature of 40 to 120° C., preferably 50 to 90° C. Also a pressure is not particularly limited. Usually, a polymerization is effected under a pressure of 1 to 100 atm, preferably 5 to 40 atm.

The polymerization is effected in the presence of hydrogen. A supplying amount of hydrogen to a polymerization reactor is not particularly limited. An amount of hydrogen necessary for obtaining a desired melt flow rate (hereinafter, referred to as MER) can be supplied.

MFR of a propylene-based polymer obtained in the first step polymerization reactor 1 can be optionally determined. Generally, however, by taking moldability into consideration, polymerization conditions are determined so that MFB may be 0.1 to 3000 g/10 min., preferably 1 to 300 g/10 min.

A ratio of an amount of a polymer generated in the first polymerization step to that of a finally obtained polymer is not particularly limited. However, by taking the balance between stiffness and impact strength into account, in the first polymerization step, a polymer is generated preferably in an amount of 30 to 95% by weight, in particular, 50 to 93% by weight of an amount of a polymer to be finally obtained. Namely, by taking a process performance in the second polymerization step into consideration, operation conditions in the first polymerization step are determined so as to provide such a ratio.

The operation conditions are determined so that an average residence time of a polymer in the first polymerization step may be around 0.1 to 8 hours, preferably around 0.5 to 5 hours, more preferably around 0.7 to 3.0 hours. Here, an average residence time is a value obtained by dividing a polymer retention amount in the first step polymerization reactor 1 with a polymer amount discharged from the first step polymerization reactor 1 to the second polymerization step per an unit time.

It should be noted that an average CE of a polymer discharged from the first step polymerization reactor 1 and is fed to the second polymerization step is preferably higher than a certain level. Here, CE represents a catalytic efficiency and means a generated polymer amount per a unit weight of a solid catalyst. In a case where an average CE is low, various disadvantages may arise, i.e., not only a catalyst cost rises, but also a thermal stability and weatherability of a finally obtained polymer decrease because of a large amount of a catalyst residue included in the finally obtained polymer.

In order to prevent the above-described disadvantages, a means such as increase in a feeding amount of an additive or de-ash treatment can be used. However, these means may invite an increase in a cost and, therefore, cannot be preferable. Accordingly, the above-described average CE is preferably 5000 g/g or more, more preferably 10000 g/g or more.

In the present invention, in order to prevent a short pass from the first step polymerization reactor 1 to the second polymerization step, a classification system comprising a precipitating liquid classifier 4 and a condenser 3 is provided between the first step polymerization reactor 1 and the second polymerization step.

The construction of the system is not particularly limited as long as the object of suppressing short pass can be achieved.

Here, the precipitating liquid classifier 4 means an apparatus which separates polymer particles depending upon a particle diameter by counter-current contacting slurry discharged from the first step polymerization reactor 1 with a medium for classification (preferably a supernatant of a low concentration slurry obtained from a condenser 3 (detail will be described later)) inside the apparatus. In this precipitating liquid classifier 4, particles having a large particle diameter of polymer particles supplied thereto have a high probability of settling against the counter current inside the classifier 4. The slurry including a large amount of particles having a large particle diameter thus settled is discharged from the body part of the classifier 4 through an outlet and fed to the second polymerization step. While, particles having a small particle diameter have a high probability of rising together with the above-described counter-current. Thus, the slurry including a large amount of particles having a small particle diameter is discharged from the upper part of the classifier 4. Thus, the separation corresponding to a particle diameter can be achieved.

The most part of the slurry including a large amount of particles having a small particle diameter thus obtained is returned to the polymerization reactor 1 via the condenser 3, and the polymerization is continued. The remaining slurry is sent to a low pressure gas post treatment system 9 through line 8 and further sent to the second polymerization step through line 11 so that the accumulation of finely-divided particles in the polymerization reactor 1 may be prevented. A ratio of an amount of the slurry returned to the polymerization reactor 1 and that of the remaining slurry to the second polymerization step or to the post treatment system of course depends on accumulation speed of a finely-divided particle in the polymerization reactor 1. However, for the purpose of not impairing the inherent effect of the classification system, the slurry including a large amount of particles having a small particle diameter is preferably returned to the polymerization reactor 1 in an amount of 50 to less than 100 wt %, preferably 90 to less than 100 wt %.

In accordance with the present invention, the classifier 4 is used in combination with the condenser 3 of slurry. As the condenser 3, a liquid cyclone, a centrifuge or a filter is used. In case of a continuous operation, the liquid cyclone is suitably used because of an excellent operation ability, a small size, cheap and a small installation area. If operation conditions of the liquid cyclone are appropriately selected, slurry can be separated into a supernatant substantially free from particles and a concentrated slurry. If the supernatant substantially free from particles thus obtained is used as a counter current of the classifier 4, a liquid amount to be used in the process can be reduced so that a load to the process can be advantageously reduced.

Supplying order of the slurry discharged from the polymerization reactor 1 in the first polymerization step to the condenser 3 and to the precipitating liquid classifier 4 is optional. However, supplying to the classifier 4 first is advantageous because a pressure loss is small and, therefore, a slurry supplying pump 2 can be constructed to have a small size. Further, advantageously, the supernatant obtained from the condenser 3 can have a wide range of flow rate operation.

According to such a manner, of the polymer obtained from the first step polymerization reactor 1, particle group comprising particles having a relatively large particle diameter discharged from the lower part of the precipitating liquid classifier 4, and optionally particles having a small particle diameter in a small amount are sent to the second polymerization step.

The above-described particle group is obtained as a slurry comprising the polymer and liquid propylene. However, in a case where the polymer is supplied to a copolymerization reactor (gaseous phase polymerization reactor) 7 in the second polymerization step, wherein the polymer is subjected to the gaseous phase polymerization, in the state of containing liquid propylene, such undesirable phenomena are liable to occur that a temperature distribution in the copolymerization reactor 7 is enlarged and unevenness of the flow state of the polymer is increased. For avoiding such phenomena, prior to supplying the polymer slurry to the copolymerization reactor 7 in the second polymerization step, the polymer is desirably made to have a state of comprising substantially no liquid.

In the present invention, the first polymerization step comprises polymerization using liquid propylene as the medium and, therefore, the above-described problem can be avoided by vaporizing the liquid propylene by means of a degassing system. The degassing system is not particularly limited. However, suitably used a system constructed by a double pipe type heat exchanger 5 and a fluid flashing tank (degassing tank) 6. In the gaseous phase copolymerization in the copolymerization reactor 7, propylene and an α-olefin are copolymerized in the presence of the propylene-based polymer generated in the first step polymerization reactor 1 and under the stereoregular polymerization catalyst in the first polymerization step. Here, "under the stereoregular polymerization catalyst in the first polymerization step" means that at least a part of the copolymerization reaction in the second polymerization step is initiated or continued by the stereoregular polymerization catalyst used in the first polymerization step. Thus, in this second polymerization step, occurs a copolymerization caused solely by the activity of the stereoregular polymerization catalyst to be present in the copolymerization reactor 7 in the second polymerization step, which is carried with the polymer generated in the first step polymerization reactor 1; and also occurs a copolymerization caused by the activity of the catalyst derived from the first polymerization step and the activity of a catalyst or a catalytic component newly added in the second polymerization step.

As the α-olefin to be used in the second polymerization step, mention may be made of those preferably having 2 to 12 carbon atoms, e.g., ethylene, 1-butene, 1-pentene and hexene. Among these compounds, ethylene and 1-butene are preferably used, and ethylene is most preferably used. A propylene concentration in a gaseous phase is generally less than 90 mol %, preferably 30 to 85 mol %. By adjusting the propylene concentration in the gaseous phase in this range, the impact strength of a block copolymer to be finally obtained is liable to be improved.

A deactivating compound to be supplied to the second polymerization step is one having a function of suppressing activity of a catalyst. Examples of the same include an active hydrogen compound and an electron-donating compound. As the active hydrogen compound, water, alcohol, phenol, carboxylic acid, sulfonic acid and amine other than tertiary amines can be mentioned.

Specific examples of the alcohol include an aliphatic alcohol having about 1 to 12 carbon atoms such as methanol, ethanol, n-propyl alcohol, i-propyl alcohol, n-butyl alcohol, n-hexyl alcohol, n-octyl alcohol, n-docecanol, 2-ethylhexyl alcohol, cyclohexanol, ethylene glycol and propylene glycol; an alcohol having a functional group such as methoxy ethanol, ethoxy ethanol and diethylene glycol.

Specific examples of the phenol include phenol, cresol, xylenol, t-butyl alcohol and 2,6-dimethyl-4-t-butyl alcohol.

Specific examples of the carboxylic acid include those having about 1 to 12 carbon atoms such as formic acid, acetic acid, propionic acid, lactic acid, stearic acid, acrylic acid, methacrylic acid, benzoic acid and salicylic acid.

Specific examples of the sulfonic acid include methane sulfonic acid, ethane sulfonic acid, benzene sulfonic acid, toluene sulfonic acid and 4-ethylbenzene sulfonic acid.

As the amine other than tertiary amines, mention may be made of methyl amine, ethyl amine, n-propyl amine, i-propyl amine, n-butyl amine, n-octyl amine, cyclohexyl amine, aniline, benzyl amine, dimethyl amine, diethyl amine, di-n-propyl amine, di-i-propyl amine, di-n-butyl amine, di-n-octyl amine, dicyclohexyl amine, diphenyl amine and dibenzyl amine As the electron-donating compound, compounds such as an aldehyde, a ketone, an ester and an ether can be mentioned. Specifically, as the aldehyde, an aliphatic aldehyde having about 2 to 12 carbon atoms such as acetaldehyde, ethylaldehyde, propylaldehyde and biutylaldehyde can be mentioned. As the ketone, an aliphatic ketone having about 3 to 12 carbon atoms such as acetone, methyl ethyl ketone and methyl isobutyl ketone can be mentioned. As the ester, an aliphatic or aromatic carboxylate having 2 to 15 carbon atoms such as methyl formate, methyl acetate, ethyl acetate, methyl acrylate, ethyl benzoate and methyl para-toluate can be mentioned. As the ether, mention may be made of an aliphatic ether having 2 to 15 carbon atoms such as diethyl ether, dipropyl ether and dibutyl ether.

These deactivating compounds can be used alone or in any mixture thereof. Of these deactivating compounds, preferable compounds are those having a relatively low boiling point and also having not so strong odor. In particular, an alcohol having a relatively small number of carbon atoms is preferable and ethanol is the most preferable.

A supplying amount of the deactivating compound is not particularly limited. However, the deactivating compound is preferably used in an amount of more than 1.0 in terms of molar ratio to aluminum in an organic aluminum compound to be supplied to the second polymerization step. In a case where it is supplied in an amount less than 1.0 in terms of molar ratio, improvement effects in an impact strength and/or particle fluidity are liable to be rather small compared with a case of supplying in an amount of more than 1.0 in terms of molar ratio. In view of improving impact strength, the molar ratio is desirably to be higher. However, if it is too high, the polymerization activity of rubber is noticeably decreased, which is undesirable from the aspect of productivity. Accordingly, a supplying amount of the active hydrogen compound is preferably from more than 1.0 to less than 3.0, more preferably from 1.1 to 2.5, in terms of molar ratio to aluminum in an organic aluminum compound to be fed to the second polymerization step.

A supplying method of the deactivating compound is optional. Namely, it may be dissolved in a solvent such as n-hexane or toluene and supplied. Alternatively, it may be directly supplied without using a solvent.

Further, the supplying position can be optional as long as such an object can be achieved that the copolymerization of propylene and an α-olefin in the second polymerization step is effected in the presence of a deactivating compound.

Specifically, mention may be made of a method wherein a deactivating compound is supplied from the lower part of a dispersing plate in the gaseous phase polymerization reactor used as the copolymerization reactor 7 in the second polymerization step; a method wherein a deactivating compound is supplied to a circulating gas line of the gaseous phase polymerization reactor; a method wherein a deactivating compound is supplied to a bed layer comprising polymer particles in the gaseous phase polymerization reactor; a method wherein a deactivating compound is supplied from the above of the bed layer; a method wherein a deactivating compound is supplied to a degassing tank 6 provided between the first step polymerization reactor 1 and the copolymerization reactor 7 in the second polymerization step; and a method wherein a deactivating compound is supplied to a transferring pipe provided between the degassing tank 6 and the copolymerization reactor 7 in the second polymerization step. One supplying position or, depending upon a necessity, two or more supplying positions may be provided. Among these methods, in view of the effective dispersion of a deactivating compound, is desirable a method wherein the deactivating compound is supplied from the lower part of the dispersing plate of the gaseous phase polymerization reactor.

An amount of a polymer to be generated in the second polymerization step can be determined corresponding to a generated amount of a polymer in the first polymerization step. Usually, by taking a balance between stiffness and impact strength into consideration, it may selected from a range of 5 to 70% by weight, preferably 7 to 50% by weight.

A polymerization temperature, polymerization time and polymerization pressure in the second polymerization step are not particularly limited. However, by taking the above-described polymerization ratio into consideration, they are selected from the following ranges: polymerization temperature=0 to 100° C., preferably 25 to 90° C.; polymerization time=0.1 to 6 hours, preferably 0.5 to 3 hours; polymerization pressure=0.1 to 100 atm, preferably 1 to 40 atm. It should be noted that, here, the polymerization time is defined in terms of an average residence time of a polymer in the second polymerization step.

A molecular weight of a copolymer to be obtained in the second polymerization step can be optionally determined. Usually, however, from the balance between physical properties and moldability, the copolymer is formed so that it may have a molecular weight of 200,000 to 3,000,000, preferably 400,000 to 2,000,000 in terms of weight average molecular weight. For controlling a molecular weight, usually hydrogen is used.

Depending upon a molecular weight of a copolymer obtained in the second polymerization step and a ratio of an amount of the copolymer to that of the total polymer, MER of a block copolymer to be finally obtained is determined. The range of the MFR is not particularly limited. However, by taking a moldability into consideration, usually, it is 0.01 to 3000 g/10 min., preferably 0.1 to 1000 g/10 min. The type of a polymerization reactor to be used for the gaseous phase polymerization in the second polymerization step is not particularly limited. Namely, a known fluidized bed, stirred fluidized bed and stirred reactor can be used.

It should be noted that after completion of polymerization in the first step and the second step, successively, third step and subsequent step polymerization can be effected. In these polymerization steps, a polymerization wherein a propylene concentration in a gaseous phase is less than 90 mol %, i.e., copolymerization of propylene and ethylene, homopolymerization of ethylene, and copolymerization of ethylene and another α-olefin, can be effected.

As a low pressure gas post treatment system 9, a low pressure degassing tank equipped with a compressor for recovering unreacted propylene and an α-olefin and an apparatus for deactivating a catalyst and a co-catalyst included in the polymer, or for drying a solvent are arranged. The above-described slurry comprising particles having a small particle size transferred through line 8 from a precipitating liquid classifier 4 is mixed with normal particles in this system, and the mixture obtained is fed to a product system comprising an extruder.

Next, with referring to FIG. 2, the third embodiment of the present invention will be described in detail.

In accordance with the present invention, first polymerization step is first effected in first polymerization reactor (propylene first polymerization reactor) 21, then in second polymerization reactor (propylene second polymerization reactor) 25.

In the present invention, the polymerization in the first polymerization step employs a polymerization method using liquid propylene as a medium. The polymerization method using propylene itself as a medium can provide a high catalytic efficiency in a short time in the first polymerization step. Thus, the method is advantageous in view of cost, and the method is further advantageous in the point that as a later described classification system, a wet classification can be adopted. It should be noted that the wet classification generally can provide a high classification efficiency as compared with a case employing a dry classification. Therefore, the wet classification is advantageous in suppressing a short-pass in the first polymerization step. Further, a wet classification by means of a precipitating liquid classifier 24 is suitable for the present invention. In this case, liquid propylene can be used as a medium for classification and, therefore, the utilization of another medium is not required to be used, which is an advantageous point in the wet classification. Still further, the method is, also advantageous in that the separation of a polymer from unreacted propylene can be readily effected.

In the present invention, a polymerization temperature in respective polymerization reactors is not particularly limited. However, a polymerization is usually effected at a temperature of 40 to 120° C., preferably 50 to 90° C. Also a pressure is not particularly limited. Usually, a polymerization is effected under a pressure of 1 to 100 atm, preferably 5 to 50 atm.

The polymerization is effected in the presence of hydrogen. A supplying amount of hydrogen to a polymerization reactor is not particularly limited. An amount of hydrogen necessary for obtaining a desired melt flow rate (hereinafter, referred to as MFR) can be supplied. MFR of a propylene-based polymer obtained in the respective polymerization reactors 21 and 25 in the first polymerization step can be optionally determined. Generally, however, by taking moldability into consideration, polymerization conditions are determined so that MFR may be 0.1 to 3000 g/10 min., preferably 0.2 to 300 g/10 min. Particularly, for improving moldability, also can be used a polymerization method wherein reactors 21 and 25 have different MFR, respectively. A ratio of an amount of a polymer generated in the first polymerization stop to that of a finally obtained polymer is not particularly limited. However, by taking the balance between stiffness and impact strength into account, in the first polymerization step, a polymer is generated preferably in an amount of 30 to 95% by weight, in particular, 50 to 93% by weight of an amount of a polymer to be finally obtained. Namely, by taking a process performance in the second polymerization step into consideration, operation conditions in the first polymerization step are determined so as to provide such a ratio.

The operation conditions are determined so that an average residence time of a polymer in the first polymerization step may be around 0.1 to 8 hours, preferably around 0.5 to 5 hours, more preferably around 0.7 to 3.0 hours. Here, an average residence time is a value obtained by dividing a polymer retention amount in the first polymerization step with a polymer amount discharged from the first polymerization step to the second polymerization step per an unit time.

It should be noted that an average CE of a polymer discharged from the first polymerization step and is ted to the second polymerization step is preferably higher than a certain level.

Here, CE represents a catalytic efficiency and means a generated polymer amount per a unit weight of a solid catalyst. In a case where an average CE is low, various disadvantages may arise, i.e., not only a catalyst cost rises, but also a thermal stability and weatherability of a finally obtained polymer decrease because of a large amount of a catalyst residue included in the finally obtained polymer. In order to prevent the above-described disadvantages, a means such as increase in a feeding amount of an additive or de-ash treatment can be used. However, these means may invite an increase in a cost and, is therefore, cannot be preferable. Accordingly, the above-described average CE is preferably 5000 g/g or more, more preferably 10,000 g/g or more, and the most preferably 30,000g/g or more.

In the present invention, in order to prevent a short pass from the first polymerization step to the second polymerization step, a classification system comprising a precipitating liquid classifier 24 and a condenser 23 is used. The construction of the system is not particularly limited as long as the object of suppressing short pass can be achieved.

Further, in the present invention, short pass is further suppressed by the second polymerization reactor 25 additionally provided at the outlet side of a liquid precipitating classifier 24 connected to the outlet of the first polymerization reactor 21, whereby, consequently, the formation of gel is suppressed to be able to obtain a polymer having a high impact strength.

Here, the precipitating liquid classifier 24 means an apparatus which separates polymer particles depending upon a particle diameter by counter-current contacting slurry discharged from the first step polymerization reactor 21 with a medium for classification (preferably a supernatant of a low concentration slurry obtained from a condenser 23) inside the apparatus. In this precipitating liquid classifier 24, particles having a large particle diameter of polymer particles supplied thereto have a high probability of settling against the counter current inside the classifier 24. The slurry including a large amount of particles having a large particle diameter thus settled is discharged from the body part of the classifier 24 through an outlet and fed to second polymerization reactor 25. While, particles having a small particle diameter have a high probability of rising together with the above-described counter-current. Thus, the slurry including a large amount of particles having a small particle diameter is discharged from the upper part of the classifier 24. Thus, the separation corresponding to a particle diameter can be achieved.

All or most part of the slurry including a large amount of particles having a small particle diameter thus obtained is returned to the first polymerization reactor 21 via the condenser 23, and the polymerization is continued. Optionally, a part of the slurry is sent to a low pressure gas post treatment system 29 through line 212, or sent to the second polymerization reactor 25 through line 211 so that the accumulation of finely-divided particles in the first polymerization reactor 21 may be prevented. A ratio of an amount of the slurry returned to the first polymerization reactor 21 and that of the remaining slurry sent to the post treatment system or to the second polymerization reactor 25 of course depends on accumulation speed of a finely-divided particle in the first polymerization reactor 21. However, for the purpose of not impairing the inherent effect of the classification system, the slurry including a large amount of particles having a small particle diameter is preferably returned to the first polymerization reactor 21 in an amount of 50 to less than 100 wt %, preferably 90 to less than 100 wt %.

In accordance with the present invention, the classifier 24 is used in combination with the condenser 23 of slurry. As the condenser 23, a liquid cyclone, a centrifuge or a filter is used. In case of a continuous operation, the liquid cyclone is suitably used because of an excellent operation ability, a small size, cheap and a small installation area.

If operation conditions of the liquid cyclone are appropriately selected, slurry can be separated into a supernatant substantially free from particles and a concentrated slurry. If the supernatant substantially free from particles thus obtained is used as a counter current of the classifier, a liquid amount to be used in the process can be reduced so that a load to the process can be advantageously reduced.

Supplying order of the slurry discharged from the first polymerization reactor 21 in the first polymerization step to the condenser 23 and to the precipitating liquid classifier 24 is optional. However, supplying to the classifier 24 first is advantageous because of a low pressure loss and, therefore, a slurry supplying pump 22 can be constructed to have a small size. Further, advantageously, the supernatant obtained from the condenser 23 can have a wide range of flow rate operation.

According to such a manner, of the polymer obtained from the first polymerization reactor 21, particle group comprising particles having a relatively large particle diameter, and optionally particles having a small particle diameter in a small amount are sent to the second polymerization reactor 25.

A ratio of a polymerized amount in the first polymerization reactor 21 and that of the second polymerization reactor 25 greatly affects the short pass to the second polymerization step. For example, when a polymerized amount in the first polymerization reactor 21 is extremely lower than that of the second polymerization reactor 25, the load to the precipitating liquid classifier 24 is to be relatively large to invite a state which may be considered to readily cause short pass under the same classification performance. While, in a case where the polymerized amount in the first polymerization reactor 21 is extremely higher than that of the second polymerization reactor 25, the same phenomenon as described above may occur. The ratio of the polymerized amount in the first polymerization reactor 21 and that of the second polymerization reactor 25 is 35:65 to 99:1, preferably 50:50 to 85:15. The polymerization condition for providing such a ratio can effectively suppress the short pass of polymer particles from the first polymerization process to result in suppressing of the formation of gel.

The above-described particle group is obtained as a slurry comprising the polymer and liquid propylene. However, in a case where the polymer is supplied to a copolymerization reactor (gaseous phase polymerization reactor) 28 in the second polymerization step in the state of containing liquid propylene, such undesirable phenomena are liable to occur that a temperature distribution in the gaseous phase polymerization reactor is enlarged and unevenness of the flow state of the polymer is increased. For avoiding such phenomena, prior to supplying the polymer slurry to the gaseous phase polymerization reactor in the second polymerization step, the polymer is desirably made to have a state of comprising substantially no liquid.

In the present invention, the first polymerization step comprises polymerization using liquid propylene as the medium and, therefore, the above-described problem can be avoided by vaporizing the liquid propylene by means of a degassing system. The degassing system is not particularly limited. However, suitably used a system constructed by a double pipe type heat exchanger 26 and a fluid flashing tank (degassing tank) 27.

In the second polymerization step, propylene and an $\alpha$-olefin are copolymerized in the presence of the propylene-based polymer generated in the first polymerization step and under the stereoregular polymerization catalyst introduced in the first polymerization step. Here, "under the stereoregular polymerization catalyst introduced in the first polymerization step" means that at least a part of the copolymerization reaction in the second polymerization step is initiated or continued by the stereoregular polymerization catalyst used in the first polymerization step. Thus, in this second polymerization step, occurs a copolymerization caused solely by the activity of the stereoregular polymerization catalyst to be present in the second polymerization step, which is carried with the polymer generated in the first polymerization step; and also occurs a copolymerization caused by the activity of the catalyst derived from the first polymerization step and the activity of a catalyst or a catalytic component newly added in the second polymerization step.

As the $\alpha$-olefin to be used in the second polymerization step, mention may be made of those preferably having 2 to 12 carbon atoms, e.g., ethylene, 1-butene, 1-pentene and 1-hexene. Among these compounds, ethylene and 1-butene are preferably used, and ethylene is most preferably used. A propylene concentration in a gaseous phase is generally less than 90 mol %, preferably 30 to 85 mol %. By adjusting the propylene concentration in the gaseous phase in this range, the impact strength of a block copolymer to be finally obtained is liable to be improved.

A deactivating compound to be supplied to the second polymerization step is one having a function of suppressing the function of a polymerization catalyst. Examples of the same include an active hydrogen compound and an electron-donating compound. As the active hydrogen compound, water, alcohol, phenol, carboxylic acid, sulfonic acid and amine other than tertiary amines can be mentioned.

Specific examples of the alcohol include an aliphatic alcohol having about 1 to 12 carbon atoms such as methanol, ethanol, n-propyl alcohol, i-propyl alcohol, n-butyl alcohol, n-hexyl alcohol, n-octyl alcohol, n-docecanol, 2-ethylhexyl alcohol, cyclohexanol, ethylene glycol and propylene glycol; an alcohol having a functional group such as methoxy ethanol, ethoxy ethanol and diethylene glycol.

Specific examples of the phenol include phenol, cresol, xylenol, t-butyl alcohol and 2,6-dimethyl-4-t-butyl alcohol.

Specific examples of the carboxylic acid include those having about 1 to 12 carbon atoms such as formic acid, acetic acid, propionic acid, lactic acid, stearic acid, acrylic acid, methacrylic acid, benzoic acid and salicylic acid.

Specific examples of the sulfonic acid include methane sulfonic acid, ethane sulfonic acid, benzene sulfonic acid, toluene sulfonic acid and 4-ethylbenzene sulfonic acid.

As the amine other than tertiary amines, mention may be made of methyl amine, ethyl amine, n-propyl amine, i-propyl amine, n-butyl amine, n-octyl amine, cyclohexyl amine, aniline, benzyl amine, dimethyl amine, diethyl amine, di-n-propyl amine, di-i-propyl amine, di-n-butyl amine, di-n-octyl amine, dicyclohexyl amine, diphenyl amine and dibenzyl amine.

As the electron-donating compound, compounds such as an aldehyde, a ketone, an ester and an ether can be mentioned. Specifically, as the aldehyde, an aliphatic aldehyde having about 2 to 12 carbon atoms such as acetaldehyde, ethylaldehyde, propylaldehyde and butylaldehyde can be mentioned. As the ketone, an aliphatic ketone having about 3 to 12 carbon atoms such as acetone, methyl ethyl ketone and methyl isobutyl ketone can be mentioned. As the ester, an aliphatic or aromatic carboxylate having 2 to 15 carbon atoms such as methyl formate, methyl acetate, ethyl acetate, methyl acrylate, ethyl benzoate and methyl para-toluate can be mentioned. As the ether, mention may be made of an aliphatic ether having 2 to 15 carbon atoms such as diethyl ether, dipropyl ether and dibutyl ether.

These deactivating compounds can be used alone or in any mixture thereof. Of these deactivating compounds, preferable compounds are those having a relatively low boiling point and also having not so strong odor. In particular, an alcohol having a relatively small number of carbon atoms is preferable and ethanol is the most preferable.

A supplying amount of the deactivating compound is not particularly limited. However, the deactivating compound is preferably used in an amount of more than 1.0 in terms of molar ratio to aluminum in an organic aluminum compound to be supplied to the second polymerization step. In a case where it is supplied in an amount less than 1.0 in terms of molar ratio, improvement effects in an impact strength and/or particle fluidity are liable to be rather small compared with a case of supplying in a molar ratio more than 1.0. In view of improving impact strength, the molar ratio is desirably to be higher. However, if it is too high, the polymerization activity of rubber is noticeably decreased, which is undesirable from the aspect of productivity. Accordingly, a supplying amount of the active hydrogen compound is preferably from more than 1.0 to less than 3.0, more preferably from 1.1 to 2.5, in terms of molar ratio to aluminum in an organic aluminum compound to be fed to the second polymerization step.

A supplying method of the deactivating compound is optional. Namely, it may be dissolved in a solvent such as n-hexane or toluene and supplied. Alternatively, it may be directly supplied without using a solvent.

Further, the supplying position can be optional as long as such an object can be achieved that the copolymerization of propylene and an α-olefin in the second polymerization step is effected in the presence of a deactivating compound.

Specifically, mention may be made of a method wherein a deactivating compound is supplied from the lower part of a dispersing plate in the gaseous phase polymerization reactor 28 in the second polymerization step; a method wherein a deactivating compound is supplied to a circulating gas line of the gaseous phase polymerization reactor; a method wherein a deactivating compound is supplied to a bed layer comprising polymer particles in the gaseous phase polymerization reactor; a method wherein a deactivating compound is supplied from the above of the bed layer; a method wherein a deactivating compound is supplied to a degassing tank provided between the first polymerization step and the second polymerization step; and a method wherein a deactivating compound is supplied to a transferring pipe provided between the degassing tank 27 and the copolymerization reactor 28 in the second polymerization step. One supplying position or, depending upon a necessity, two or more supplying positions may be provided. Among these methods, in view of the effective dispersion of a deactivating compound, is desirable a method wherein the deactivating compound is supplied from the lower part of the dispersing plate of the gaseous phase polymerization reactor.

An amount of a polymer to be generated in the second polymerization step can be determined corresponding to a generated amount of a polymer in the first polymerization step. Usually, by taking a balance between stiffness and impact strength into consideration, it may selected from a range of 5 to 70% by weight, preferably to 50% by weight A polymerization temperature, polymerization time and polymerization pressure are not particularly limited. However, by taking the above-described polymerization ratio into consideration, they are selected from the following ranges: polymerization temperature=0 to 100° C., preferably 25 to 90° C.; polymerization time=0.1 to 6 hours, preferably 0.5 to 3 hours; polymerization pressure=0.1 to 100 atm, preferably 1 to 40 atm. It should be noted that, here, the polymerization time is defined in terms of an average residence time of a polymer in the second polymerization step.

A molecular weight of a copolymer to be obtained in the second polymerization step can be optionally determined. Actually, however, from the balance between physical properties and moldability, the copolymer is formed so that it may have a molecular weight of 200,000 to 3,000,000, preferably 400,000 to 2,000,000 in terms of weight average molecular weight. For controlling a molecular weight, usually hydrogen is used.

Depending upon a molecular weight of a copolymer obtained in the second polymerization step and a ratio of an amount of the copolymer to that of the total polymer, MFR of a block copolymer to be finally obtained is determined. The range of the MFR is not particularly limited. However, by taking a moldability into consideration, usually, it is 0.01 to 3000 g/10 min., preferably 0.1 to 1000 g/10 min. The type of a polymerization reactor to be used for the gaseous phase polymerization in the second polymerization step is not particularly limited. Namely, a known fluidized bed, stirred fluidized bed and stirred reactor can be used.

It should be noted that after completion of polymerization in the first step and the second step, successively, third step and subsequent step sol polymerization can be effected. In these polymerization steps, a polymerization wherein a propylene concentration in a gaseous phase is less than 90 mol %, i.e., copolymerization of propylene and ethylene, homopolymerization of ethylene, and copolymerization of ethylene and another α-olefin, can be effected.

As a low pressure gas post treatment system 29, a low pressure degassing tank equipped with a compressor for recovering unreacted propylene and an α-olefin and an apparatus for deactivating a catalyst and a co-catalyst included in the polymer, or for drying a solvent are arranged. The above-described slurry comprising particles having a small particle size transferred through line 212 from a precipitating liquid classifier 24 is mixed with normal particles in this system, and the mixture obtained is fed to a product system comprising an extruder.

Next, with referring to FIG. 3, the fourth embodiment of the present invention will be described in detail.

In accordance with the present invention, first polymerization step is first effected in first polymerization reactor 31, then in second polymerization reactor 32.

In the present invention, the polymerization in the first polymerization step employs a polymerization method using liquid propylene as a medium. The polymerization method using propylene itself as a medium can provide a high catalytic efficiency in a short time in the first polymerization step. Thus, the method is advantageous in view of cost, and the method is further advantageous in the point that as a later described classification system, a wet classification can be adopted. It should be noted that the wet classification generally can provide a high classification efficiency as compared with a case employing a dry classification. Therefore, the wet classification is advantageous in suppressing a short.pass in the first polymerization step. Further, a wet classification by means of a precipitating liquid classifier 35 is suitable for the present invention. In this case, liquid propylene can be used as a medium for classification and, therefore, the utilization of another medium is not required to be used, which is an advantageous point in the wet classification. Still further, the method is also advantageous in that the separation of a polymer from unreacted propylene can be readily effected.

In the present invention, a polymerization temperature in respective polymerization reactors is not particularly limited. However, a polymerization is usually effected at a temperature of 40 to 120° C., preferably 50 to 90° C. Also a pressure is not particularly limited. Usually, a polymerization is effected under a pressure of 1 to 100 atm, preferably 5 to 50 atm.

The polymerization is effected in the presence of hydrogen. A supplying amount of hydrogen to a polymerization reactor is not particularly limited. An amount of hydrogen necessary for obtaining a desired melt flow rate (hereinafter, referred to as MFR) can be supplied. MFR of a propylene-based polymer obtained in the respective polymerization reactors 31 and 32 in the first polymerization step can be optionally determined. Generally, however, by taking moldability into consideration, polymerization conditions are determined so that MFR may be 0.1 to 3000 g/10 min., preferably 0.2 to 300 g/10 min. Particularly, for improving moldability, also can be used a polymerization method wherein reactors 21 and 25 have different MFR, respectively. A ratio of an amount of a polymer generated in the first polymerization step to that of a finally obtained polymer is not particularly limited.

However, by taking the balance between stiffness and impact strength into account, in the first polymerization step, a polymer is generated preferably in an amount of 30 to 95% by weight, in particular, 50 to 93% by weight of an amount of a polymer to be finally obtained. Namely, by taking a process performance in the second polymerization step into consideration, operation conditions in the first polymerization step are determined so as to provide such a ratio.

The operation conditions are determined so that an average residence time of a polymer in the first polymerization step may be around 0.1 to 8 hours, preferably around 0.5 to 5 hours, more preferably around 0.7 to 3.0 hours. Here, an average residence time is a value obtained by dividing a polymer retention amount in the first polymerization step with a polymer amount discharged from the first polymerization step to the second polymerization step per an unit time. It should be noted that an average CE of a polymer discharged from the first polymerization step and is fed to the second polymerization step is preferably higher than a certain level. Here, CE represents a catalytic efficiency and means a generated polymer amount per a unit weight of a solid catalyst. In a case where an average CE is low, various disadvantages may arise, i.e., not only a catalyst cost rises, but also a thermal stability and weatherability of a finally obtained polymer decrease because of a large amount of a catalyst residue included in the finally obtained polymer. In order to prevent the above-described disadvantages, a means such as increase in a feeding amount of an additive or de-ash treatment can be used. However, these means may invite an increase in a tar cost and, therefore, cannot be preferable. Accordingly, the above-described average CE is preferably 5000 g/g or more, more preferably 10000 g/g or more, and the most preferably 30000 g/g or more.

In the present invention, in order to prevent a short pass from the first polymerization step to the second polymerization step, a classification system comprising a precipitating liquid classifier 35 and a condenser 34 is used. The construction of the system is not particularly limited as long as the object of suppressing short pass can be achieved. Further, in the present invention, short pass is further suppressed by connecting two bulk polymerization reactors in series, whereby, finally, the formation of gel is suppressed to be able to obtain a polymer having a high impact strength.

Here, the precipitating liquid classifier 35 means an apparatus which separates polymer particles depending upon a particle diameter by counter-current contacting slurry discharged from the second polymerization reactor 32 with a medium for classification (preferably a supernatant of a low concentration slurry obtained from a condenser 34) inside the apparatus. In this precipitating liquid classifier 35, particles having a large particle diameter of polymer particles supplied thereto have a high probability of settling against the counter current inside the classifier 35. The slurry including a large amount of particles having a large particle diameter thus settled is discharged from the body part of the classifier 35 through an outlet and fed to second polymerization process, while particles having a small particle diameter have a high probability of rising together with the above-described counter-current. Thus, the slurry including a large amount of particles having a small particle diameter is discharged from the upper part of the classifier 35. Thus, the separation corresponding to a particle diameter can be achieved.

The most part of the slurry including a large amount of particles having a small particle diameter thus obtained is returned to the second polymerization reactor 32 via the condenser 34, and the polymerization is continued. The remaining slurry including a large amount of particles having a small particle diameter is sent to a low pressure gas post treatment system 39 through line 312 and further sent to the copolymerization reactor (gaseous phase polymerization reactor) 38 in the second step polymerization through line 311 so that the accumulation of finely-divided particles in the second polymerization reactor 32 may be prevented. A ratio of an amount of the slurry returned to the second polymerization reactor 32 and that of the remaining slurry sent to the post treatment system or to the copolymerization reactor of course depends on accumulation speed of a finely-divided particle in the second polymerization reactor 32. However, for the purpose of not impairing the inherent effect of the classification system, the slurry including a large amount of particles having a small particle diameter is preferably returned to the second polymerization reactor 32 in an amount of 50 to less than 100 wt %, preferably 90 to less than 100 wt %.

In accordance with the present invention, the classifier 35 is used in combination with the condenser 34 of slurry. As the condenser 34, a liquid cyclone, a centrifuge or a filter is used. In case of a continuous operation, the liquid cyclone is suitably used because of an excellent operation ability, a small size, cheap and a small installation area.

If operation conditions of the liquid cyclone are appropriately selected, slurry can be separated into a supernatant substantially free from particles and a concentrated slurry. If the supernatant substantially free from particles thus obtained is used as a counter current of the classifier, a liquid amount to be used in the process can be reduced so that a load to the process can be advantageously reduced.

Supplying order of the slurry discharged from the second polymerization reactor 32 in the first polymerization step to the condenser 34 and to the precipitating liquid classifier 35 is optional. However, supplying to the classifier 35 first is advantageous because of a low pressure loss and, therefore, a slurry supplying pump 33 can be constructed to have a small size. Further, advantageously, the supernatant obtained from the condenser 34 can have a wide range of flow rate operation.

According to such a manner, of the polymer obtained from the first polymerization step, particle group comprising particles having a relatively large particle diameter discharged from the body part of the classifier 35 through an outlet, and optionally particles having a small particle diameter in a small amount are sent to the second polymerization step.

A ratio of a polymerized amount in the first polymerization reactor 1 and that of the second polymerization reactor 32 greatly affects the short pass to the second polymerization step. For example, when a polymerized amount in the first polymerization reactor 31 is extremely lower than that of the second polymerization reactor 32, the load to the precipitating liquid classifier 35 is to be relatively large to invite a state which may be considered to readily cause short pass under the same classification performance. While, in a case where the polymerized amount in the first polymerization reactor 31 is extremely higher than that of the second polymerization reactor 32, the same phenomenon as described above may occur. The ratio of the polymerized amount in the first polymerization reactor 31 and that of the second polymerization reactor 32 is 15:85 to 85:15, preferably 30:70 to 70:30. The polymerization condition for providing such a ratio can effectively suppress the short pass of polymer particles from the first polymerization process to result in suppressing of the formation of gel.

The above-described particle group is obtained as a slurry comprising the polymer and liquid propylene. However, in a case where the polymer is supplied to a gaseous phase polymerization reactor 38 in the second polymerization step in the state of containing liquid propylene, such undesirable phenomena are liable to occur that a temperature distribution in the copolymerization reactor 38 is enlarged and unevenness of the flow state of the polymer is increased. For avoiding such phenomena, prior to supplying the polymer slurry to the gaseous phase polymerization reactor 38 in the second polymerization step, the polymer is desirably made to have a state of comprising substantially no liquid.

In the present invention, the first polymerization step comprises polymerization using liquid propylene as the medium and, therefore, the above-described problem can be avoided by vaporizing the liquid propylene by means of a degassing system. The degassing system is not particularly limited. However, suitably used a system constructed by a double pipe type heat exchanger 36 and a fluid flashing tank (degassing tank) 37.

In the second polymerization step, propylene and α-olefin are copolymerized substantially in a gaseous phase using the copolymerization reactor 38 in the presence of the propylene-based polymer generated in the first polymerization step and under the stereoregular polymerization catalyst introduced in the first polymerization step. Here, "under the stereoregular polymerization catalyst introduced in the first polymerization step" means that at least a part of the copolymerization reaction in the second polymerization step is initiated or continued by the stereoregular polymerization catalyst used in the first polymerization step. Thus, in this second polymerization step, occurs a copolymerization caused solely by the activity of the stereoregular polymerization catalyst to be present in the second polymerization step, which is carried with the polymer generated in the first polymerization step; and also occurs a copolymerization caused by the activity of the catalyst derived from the first polymerization step and the activity of a catalyst or a catalytic component newly added in the second polymerization step.

As the α-olefin to be used in the second polymerization step, mention may be made of those preferably having 2 to 12 carbon atoms, e.g., ethylene, 1-butene, 1-pentene and 1-hexene. Among these compounds, ethylene and 1-butene are preferably used, and ethylene is most preferably used. A propylene concentration in a gaseous phase is generally less than 90 mol %, preferably 30 to 85 mol %. By adjusting the propylene concentration in the gaseous phase in this range, the impact strength of a block copolymer to be finally obtained is liable to be improved.

A deactivating compound to be supplied to the second polymerization step is one having a function of suppressing the function of a polymerization catalyst. Examples of the same include an active hydrogen compound and an electron-donating compound. As the active hydrogen compound, water, alcohol, phenol, carboxylic acid, sulfonic acid and amine other than tertiary amines can be mentioned.

Specific examples of the alcohol include an aliphatic alcohol having about 1 to 12 carbon atoms such as methanol, ethanol, n-propyl alcohol, i-propyl alcohol, n-butyl alcohol, n-hexyl alcohol, n-octyl alcohol, n-docecanol, 2-ethylhexyl alcohol, cyclohexanol, ethylene glycol and propylene glycol; an alcohol having a functional group such as methoxy ethanol, ethoxy ethanol and diethylene glycol.

Specific examples of the phenol include phenol, cresol, xylenol., t-butyl alcohol and 2,6-dimethyl-4-t-butyl alcohol.

Specific examples of the carboxylic acid include those having about 1 to 12 carbon atoms such as formic acid, acetic acid, propionic acid, lactic acid, stearic acid, acrylic acid, methacrylic acid, benzoic acid and salicylic acid.

Specific examples of the sulfonic acid include methane sulfonic acid, ethane sulfonic acid, benzene sulfonic acid, toluene sulfonic acid and 4-ethylbenzene sulfonic acid.

As the amine other than tertiary amines, mention may be made of methyl amine, ethyl amine, n-propyl amine, i-propyl amine, n-butyl amine, n-octyl amine, cyclohexyl amine, aniline, benzyl amine, dimethyl amine, diethyl amine, di-n-propyl amine, di-i-propyl amine, di-n-butyl amine, di-n-octyl amine, dicyclohexyl amine, diphenyl amine and dibenzyl amine As the electron-donating compound, compounds such as an aldehyde, a ketone, an ester and an ether can be mentioned. Specifically, as the aldehyde, an aliphatic aldehyde having about 2 to 12 carbon atoms such as acetaldehyde, ethylaldehyde, propylaldehyde and butylaldehyde can be mentioned. As the ketone, an aliphatic ketone having about 3 to 12 carbon atoms such as acetone, methyl ethyl ketone and methyl isobutyl ketone can be mentioned. As the ester, an aliphatic or aromatic carboxylate having 2 to 15 carbon atoms such as methyl formate, methyl acetate, ethyl acetate, methyl acrylate, ethyl benzoate and methyl para-toluate can be mentioned. As the ether, mention may be made of an aliphatic ether having 2 to 15 carbon atoms such as diethyl ether, dipropyl ether and dibutyl ether.

These deactivating compounds can be used alone or in any mixture thereof. Of these deactivating compounds, preferable compounds are those having a relatively low boiling point and also having not so strong odor. In particular, an alcohol having a relatively small number of carbon atoms is preferable and ethanol is the most preferable.

A supplying amount of the deactivating compound is not particularly limited. However, the deactivating compound is preferably used in an amount of more than 1.0 in terms of molar ratio to aluminum in an organic aluminum compound to be supplied to the second polymerization step. In a case where it is supplied in an amount less than 1.0 in terms of molar ratio, improvement effects in an impact strength and/or particle fluidity are liable to be rather small compared with a case of supplying in a molar ratio more than 1.0. In view of improving impact strength, the molar ratio is desirably to be higher. However, if it is too high, the polymerization activity of rubber is noticeably decreased, which is undesirable from the aspect of productivity. Accordingly, a supplying amount of the active hydrogen compound is preferably from more than 1.0 to less than 3.0, more preferably from 1.1 to 2.5, in terms of molar ratio to aluminum in an organic aluminum compound to be fed to the second polymerization step.

A supplying method of the deactivating compound is optional. Namely, it may be dissolved in a solvent such as n-hexane or toluene and supplied. Alternatively, it may be directly supplied without using a solvent.

Further, the supplying position can be optional as long as such an object can be achieved that the copolymerization of propylene and an α-olefin in the second polymerization step is effected in the presence of a deactivating compound.

Specifically, mention may be made of a method wherein a deactivating compound is supplied from the lower part of a dispersing plate in the gaseous phase polymerization reactor used as a copolymerization reactor 38 in the second polymerization step; a method wherein a deactivating compound is supplied to a circulating gas line of the gaseous phase polymerization reactor; a method wherein a deactivating compound is supplied to a bed layer comprising polymer particles in the gaseous phase polymerization reactor; a method wherein a deactivating compound is supplied from the above of the bed layer; a method wherein a deactivating compound is supplied to a degassing tank 37 provided between the second polymerization reactor 32 and the copolymerization reactor 38 in the second polymerization step; and a method wherein a deactivating compound is supplied to a transferring pipe provided between the degassing tank 37 and the copolymerization reactor 38 in the second polymerization step. One supplying position or, depending upon a necessity, two or more supplying positions may be provided. Among these methods, in view of the effective dispersion of a deactivating compound, is desirable a method wherein the deactivating compound is supplied from the lower part of the dispersing plate of the gaseous phase polymerization reactor.

An amount of a polymer to be generated in the second polymerization step can be determined corresponding to a generated amount of a polymer in the first polymerization step. Usually, by taking a balance between stiffness and impact strength into consideration, it may selected from a range of 5 to 70% by weight, preferably 7 to 50% by weight.

A polymerization temperature, polymerization time and polymerization pressure in the second polymerization step are not particularly limited. However, by taking the above-described polymerization ratio into consideration, they are selected from the following ranges: polymerization temperature=0 to 100° C., preferably 25 to 90° C.; polymerization time=0.1 to 6 hours, preferably 0.5 to 3 hours; polymerization pressure=0.1 to 100 atm, preferably 1 to 40 atm. It should be noted that, here, the polymerization time is defined in terms of an average residence time of a polymer in the second polymerization step.

A molecular weight of a copolymer to be obtained in the second polymerization step can be optionally determined. Usually, however, from the balance between physical properties and moldability, the copolymer is formed so that it may have a molecular weight of 200,000 to 3,000,000, preferably 400,000 to 2,000,000 in terms of weight average molecular weight. For controlling a molecular weight, usually hydrogen is used. Depending upon a molecular weight of a copolymer obtained in the second polymerization step and a ratio of an amount of the copolymer to that of the total polymer, MFR of a block copolymer to be finally obtained is determined. The range of the MFR is not particularly limited. However, by taking a moldability into consideration, usually, it is 0.01 to 3000 g/10 min., preferably 0.1 to 1000 g/10 min. The type of a polymerization reactor to be used for the gaseous phase polymerization in the second polymerization step is not particularly limited. Namely, a known fluidized bed, stirred fluidized bed and stirred reactor can be used.

It should be noted that after completion of polymerization in the first step and the second step, AS? successively, third step and subsequent step polymerization can be effected. In these polymerization steps, a polymerization wherein a propylene concentration in a gaseous phase is less than 90 mol %, i.e., copolymerization of propylene and ethylene, homopolymerization of ethylene, and copolymerization of ethylene and another α-olefin, can be effected.

As a low pressure gas post treatment system 39, a low pressure degassing tank equipped with a compressor for recovering unreacted propylene and an α-olefin and an apparatus for deactivating a catalyst and a co-catalyst included in the polymer, or for drying a solvent are arranged. The above-described slurry comprising particles having a small particle size transferred through line 312 from a precipitating liquid classifier 35 is mixed with normal particles in this system, and the mixture obtained is fed to a product system comprising an extruder.

EXAMPLES

The present invention will be further described in detail by way of the following Examples. However, the present invention is by no means limited thereto as long as the gist of the present invention is not deviated.

Example 1

(1) Preparation of Solid Catalyst Component (A)

To a 3 L-round four-necked flask equipped with a vacuum.stirrer and a thermometer was charged 2.058 mol of Mg(OEt)2. Then, $Ti(OBu)_4$ was charged in an amount 0.60 (molar ratio) in terms of $Ti(OBu)_4/Mg$ of the initially charged $Mg(OEt)_2$. The resulting mixture was heated with stirring at a rate of 300 rpm.

After reacting the content in the flask at 150° C. for 1.5 hours, the reaction mixture obtained was cooled to 120° C., then a toluene solution of $MeSi(OPh)_3$ was added thereto in an amount 0.67 (molar ratio) in terms of $MeSi(OPh)_3/Mg$ of the initially charged $Mg(OEt)_2$. After completion of the addition, the resulting mixture was reacted for 1 hour at the same temperature. After completion of the reaction, the reaction mixture was cooled to room temperature, then Si(OEt)$_4$ was added thereto in an amount of 0.05 (molar ratio) in terms of Si(OEt)$_4$/Mg of the initially charged Mg(OEt)$_2$. Thus, a slurry of a catalytic product (a*) was obtained.

All amount of the slurry thus obtained was transferred to an induction stirring type 10 L-autoclave equipped with a jacket for cooling and heating, then diluted with toluene to provide a concentration of [Mg]=0.60 mol/liter of toluene.

With stirring at 300 rpm, this slurry was cooled to −10° C., then diethyl phthalate was added in an amount of 0.10 (molar ratio) in terms of diethyl phthalate/Mg of the initially charged Mg(OEt)$_2$. Successively, TiCl$_4$ was dropwise added in an amount of 4.0 (molar ratio) in terms of TiCl$_4$/Mg of the initially charged Mg(OEt)$_2$ for 1.2 hours to form a uniform solution. During this procedure, such a phenomenon did not occur that the viscosity of the liquid rises to be gelatinous state.

The resulting uniform solution was heated to 15° C. at a rate of 0.5° C./min. and kept for 1 hour at that temperature successively, the heated solution was further heated to 50° C. at a rate of 0.5° C./min. and kept for 1 hour at 50° C. The solution obtained was further heated to 117° C. at a rate of 1.0° C./min. and treated for 1 hour at 117° C.

After completion of the treatment, heating and stirring were stopped and the supernatant was eliminated. Thereafter, the resulting product was washed with toluene so that the remaining liquid rate may be 1/55, whereby a solid slurry was obtained.

Next, an amount of toluene in the resulting solid slurry was arranged so as to provide TiCl$_4$ concentration of 2.0 mol/liter of toluene, then TiCl$_4$ was added at room temperature in an amount of 5.0 (molar ratio) in terms of TiCl$_4$/Mg of the initially charged Mg(OEt)$_2$. With stirring at 300 rpm, this slurry was heated and reacted at 117° C. for 1 hour. After completion of the reaction, heating and stirring were stopped and the supernatant was eliminated. Thereafter, the resulting product was washed with toluene so that the remaining liquid rate may be 1/150, whereby a toluene slurry (A*) was obtained.

All amount of the solid slurry thus obtained was transferred to a reactor having an inner diameter of 660 mm and a body length of 770 mm, and equipped with a Pfoudler Type blade, then diluted with n-hexane to give a concentration of (A*) of 3 g/liter. With stirring this slurry at 300 rpm, triethyl aluminum was added thereto at 25° C. so that triethyl aluminum/(A*) may be 3.44 mmol/g. Further, t-butyl-n-propyldimethoxysilane was added to the resulting mixture so that t-butyl-n-propyldimethoxysilane/(A*) may be 1.44 mmol/g. After the completion of the addition, with successively stirring, the mixture obtained was kept at 25° C. for 30 minutes.

Then, propylene gas was fed to a liquid phase at a constant rate for 72 minutes. After stopping feeding of the propylene gas, washing with n-hexane was applied thereto by means of a settling washing method to obtain a slurry of a solid catalyst component (A) having a remaining liquid rate of 1/12. The resulting solid catalyst component (A) included 2.7 g of propylene polymer per 1 g of (A*) component.

(2) Preparation of Propylene-ethylene Block Copolymer

Figure 1B:
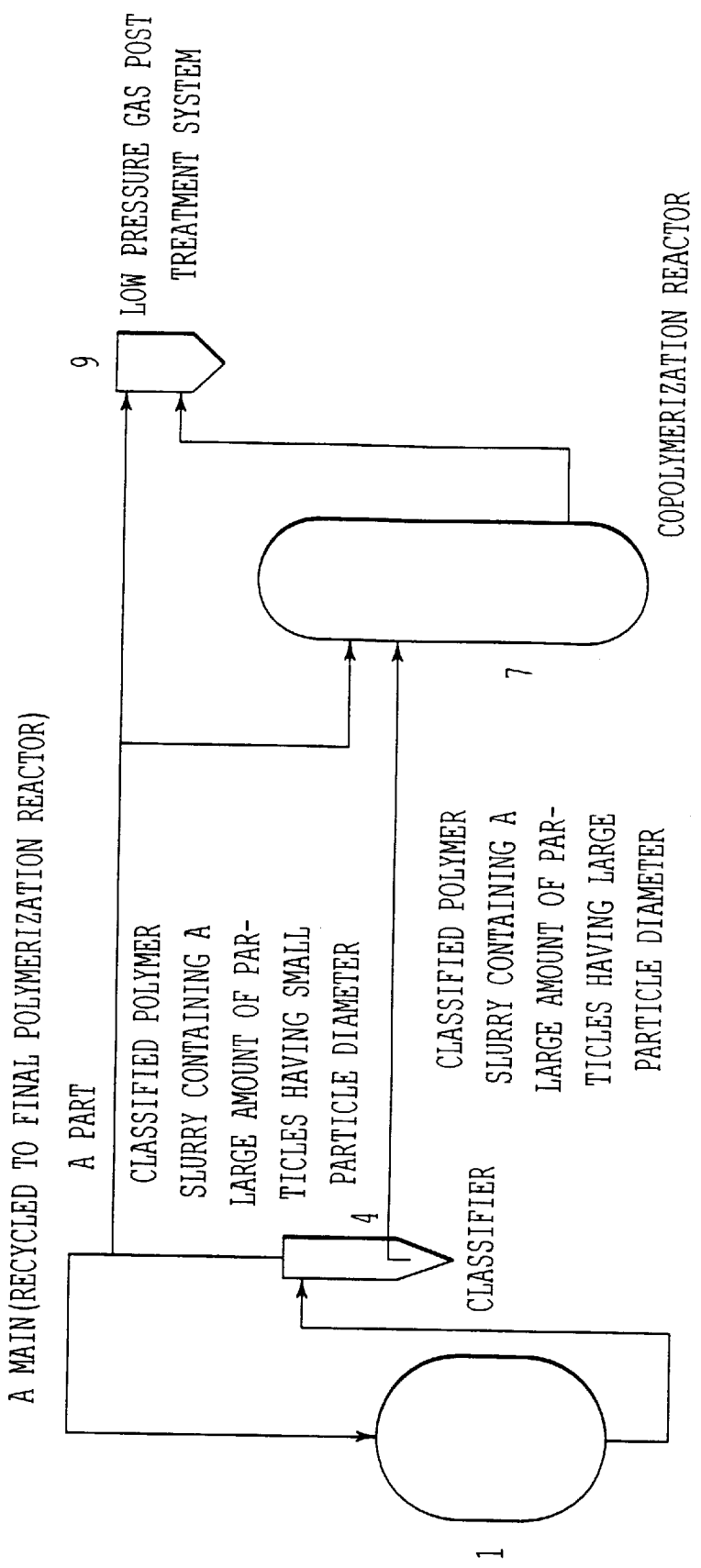
FIG. 1(b) is a flow diagram showing a polymerization process with a polymerization reactor, classifier and copolymerization reactor.

Using a continuous production process of a propylene-based block copolymer including a classification system comprising condenser 3 (liquid cyclone) and a precipitating liquid classifier 4; and a degassing system comprising a double pipe type heat exchanger 5 and a fluid flashing tank 6, which are provided between a polymerization reactor 1 equipped with a stirring unit (internal volume 1.7 m$^3$) and a stirring type gaseous phase polymerization reactor 7 (internal volume 1.9 m$^3$, shown in FIG. 1, various investigations have been conducted.

Into first step polymerization reactor (propylene polymerization reactor) 1 were fed liquefied propylene at a rate of 115 kg/hr and hydrogen in an amount of giving a hydrogen composition in a gaseous phase of 10 mol %. Further, triethylamine was fed at a rate of 48.5 g/hr and also t-butyl-n-propyldimethoxysilane was fed at a rate of 1.5 g/hr. Further, the solid catalyst component obtained in Example 1(1) was fed as (A*) component to the reaction mixture at a rate of 0.72 g/hr.

The polymerization temperature was 70° C., the pressure was 32 kgf/cm$^2$ (total pressure), and the propylene partial pressure was 28 kgf/cm$^2$. A liquid amount in the polymerization reactor was adjusted to be 1 m$^3$.

The slurry polymerized in this polymerization reactor had a slurry concentration of about 15% by weight and the slurry was fed to the upper portion of a precipitating liquid classifier 4 by means of a slurry pump 2 and contacted in a manner of counter-current with the above-described supernatant. The slurry discharged from the upper part of the precipitating liquid classifier 4 was fed to a condenser 3, and the supernatant substantially free from solid particles was discharged from the upper part of the condenser 3. The supernatant thus discharged was fed at a linear speed of 3.8 cm/sec to the precipitating liquid classifier 4 from the lower part thereof. While, a slurry having a high concentration discharged from the lower part of the condenser 3 was mostly circulated to the initial propylene polymerization reactor 1, and the remaining amount was flowed to a low pressure gas post treatment system 9 through bypass line 8 of the precipitating liquid classifier 4.

From the lower part of the precipitating liquid classifier 4, a slurry including particles having a large particle diameter was discharged. The concentration of the slurry was about 30% by weight. The rate of discharging of the slurry was controlled at 40 kg/hr in terms of propylene particles included in the slurry.

A bypass amount was 2 kg/hr.

An average residence time of the polypropylene discharged from the lower part of the precipitating liquid classifier 4 and also from the bypass line 8 in the respective propylene polymerization reactor 1 and the circulation line was 1.4 hours.

A The above-described slurry discharged from the precipitating liquid classifier 4 was fed to a fluid flashing tank 6 via a double pipe type heat exchanger 5 located downstream. The inside of the fluid flashing tank 6 was kept at 70° C. with feeding heated propylene gas from the lower part of the tank. The solid polypropylene particles obtained here were fed to a gaseous phase polymerization reactor 7 and copolymerization of propylene with ethylene was effected therein.

In order to enhance a mixing effect, in the gaseous phase polymerization reactor 7 equipped with an assisting stirring blade, a gas mixture comprising ethylene, propylene, hydrogen and nitrogen was forced to be circulated by a gas blower.

Ethylene and propylene were fed so as to constantly give a sum of partial pressure of ethylene and propylene of 13.2 kgf/cm$^2$ and a molar fraction of propylene of 55 mol %. Hydrogen was fed so as to give a hydrogen concentration of 2.3 mol %. Further, the polymerization temperature was controlled 60° C. and an average residence time of the polymer in the gaseous phase polymerization reactor was also controlled 0.6 hours.

Further, as an active hydrogen compound, ethanol was fed, and the feeding amount of ethanol was 2.0 in terms of molar ratio to aluminum in triethylaluminum supplied together with polymer particles to the gaseous phase polymerization reactor.

The polymer particles discharged from the gaseous phase polymerization reactor 7 via the low pressure gas post treatment system were analyzed. The results were; MFR= 31.0 g/10 min., bulk density=0.50 g/cc, and EPR content= 14.4% by weight, and gel in number=12/250cm$^3$.

(3) Evaluation of Physical Properties

The results of evaluation of physical properties of the block copolymer obtained in Example 1 were as follows: flexural modulus=14900 kg/cm$^2$, Izod=9.7 kg·cm/cm, surface impact strength=95 kg·cm.

Comparative Example 1

Polymerization was effected as in Example 1 except that the bypass line was not used. The resulting polymer had the following properties: MFR=35.0 g/10 min., bulk density= 0.50 g/cc, EPR content=15.0% by weight, gel in number= 12/250 cm$^2$.

(4) Evaluation of Physical Properties

The results of evaluation of physical properties of the block copolymer obtained in Comparative Example 1 were as follows: flexural modulus=14500 kg/cm$^2$, Izod=10.3 kg·cm/cm, surface impact strength=101 kg·cm.

Results of Example 1 and Comparative Example 1 are shown in the following table.

TABLE 1

| Item | Comparative Example 1 | Example 1 |
| --- | --- | --- |
| Proportion of finely divided powder in reactor (<100 μ) | 11.0 wt % | 0.4 wt % |
| Gel in number | 12/250 cm$^2$ | 12/250 cm$^2$ |
| Gas amount taken in post treatment compressor | 72% load | 100% load |

As can be seen from the table, the amount of the finely divided powder could be reduced without giving a large change in a gel number.

Example 2

Operation was effected as in Example 1 except that bypass line 11 was provided and a part of the slurry including particles having a small particle size was 10 flowed to the second polymerization step. The results of evaluation of physical properties of the block copolymer obtained in Example 2 were as follows: MPR=29.0 g/10 min., bulk density=0.50 g/cc, EPR content=14.9% by weight, gel in number=20/250 cm$^2$, flexural modulus=14600 kg/cm$^2$, Izod=10.1 kg·cm/cm, surface impact strength=100 kg·cm.

As compared with Example 1, a gel number was increased a little. However, the increased gel number was of course within an acceptable range. Thus, it became apparent that the amount of the finely divided powder could be reduced and the operation could be effected without influence from a load of the compressor of the low pressure gas post treatment system. Namely, it can be readily seen that according to the present invention, a propylene-based block copolymer having an excellent impact strength can be continuously produced stably at a low cost.

TABLE 2

| Item | Comparative Example 1 | Example 1 |
| --- | --- | --- |
| Amount of finely divided powder | 11.0 wt % | 0.3 wt % |
| Gel in number | 12/250 cm$^2$ | 20/250 cm$^2$ |
| Gas amount taken in compressor | 72% load | 72% load |

Example 3

(1) Preparation of Solid Catalyst Component (A)

To a 3 L-round four-necked flask equipped with a vacuum.stirrer and a thermometer was charged 2.058 mol of Mg(OEt)$_2$. Then, Ti(OBu)$_4$ was charged in an amount 0.60 (molar ratio) in terms of Ti(OBu)$_4$/Mg of the initially charged Mg(OEt)$_2$. The resulting mixture was heated with stirring at a rate of 300 rpm.

After reacting the content in the flask at 150° C. for 1.5 hours, the reaction mixture obtained was cooled to 120° C., then a toluene solution of MeSi(OPh)$_3$ was added thereto in an amount 0.67 (molar ratio) in terms of MeSi(OPh)$_3$/Mg of the initially charged Mg(OEt)$_2$. After completion of the addition, the resulting mixture was reacted for 1 hour at the same temperature. After completion of the reaction, the reaction mixture was cooled to room temperature, then Si(OEt)$_4$ was added thereto in an amount of 0.05 (molar ratio) in terms of Si(OEt)$_4$/Mg of the initially charged Mg(OEt)$_2$. Thus, a slurry of a catalytic product (a*) was obtained.

All amount of the slurry thus obtained was transferred to an induction stirring type 10 L-autoclave equipped with a jacket for cooling and heating, then diluted with toluene to provide a concentration of [Mg]=0.60 mol/liter of toluene.

With stirring at 300 rpm, this slurry was cooled to −10° C., then diethyl phthalate was added in an amount of 0.10 (molar ratio) in terms of diethyl phthalate/Mg of the initially charged Mg(OEt)$_2$. Successively, TiCl$_4$ was dropwise added in an amount of 4.0 (molar ratio) in terms of TiCl$_4$/Mg of the initially charged Mg(OEt)$_2$ for 1.2 hours to form a uniform solution. During this procedure, such a phenomenon did not occur that the viscosity of the liquid rises to be gelatinous state.

The resulting uniform solution was heated to 15° C. at a rate of 0.5° C./min. and kept for 1 hour at that temperature. Successively, the heated solution was further heated to 50° C. at a rate of 0.5° C./min. and kept for 1 hour at 50° C. The solution obtained was further heated to 117° C. at a rate of 1.0° C./min. and treated for 1 hour at 117° C.

After completion of the treatment, heating and stirring were stopped and the supernatant was eliminated. Thereafter, the resulting product was washed with toluene so that the remaining liquid rate may be 1/55, whereby a solid slurry was obtained.

Next, an amount of toluene in the resulting solid slurry was arranged so as to provide TiCl$_4$ concentration of 2.0 mol/liter of toluene, then TiCl$_4$ was added at room temperature in an amount of 5.0 (molar ratio) in terms of TiCl$_4$/Mg of the initially charged Mg(OEt)$_2$. With stirring at 300 rpm, this slurry was heated and reacted at 117° C. for 1 hour. After completion of the reaction, heating and stirring were stopped and the supernatant was eliminated. Thereafter, the resulting product was washed with toluene so that the remaining liquid rate may be 1/150, whereby a toluene slurry (A*) was obtained.

(2) Prepolymerization

The total amount of the solid slurry thus obtained was transferred to a reactor having an inner diameter of 660 mm and a body length of 770 mm, and equipped with a Pfoudler Type blade, then diluted with n-hexane to give a concentration of (A*) of 3 g/liter. With stirring this slurry at 300 rpm, triethyl aluminum was added thereto at 25° C. so that triethyl aluminum/(A*) may be 3.44 mmol/g. Further, t-butyl-n-propyldimethoxysilane was added to the resulting mixture so that t-butyl-n-propyldimethoxysilane/(A*) may be 1.44 mmol/g. After the completion of the addition, with successively stirring, the mixture obtained was kept at 25° C. for 30 minutes.

Then, propylene gas was fed to a liquid phase at a constant rate for 72 minutes. After stopping feeding of the propylene gas, washing with n-hexane was applied thereto by means of a settling washing method to obtain a slurry of a solid catalyst component (A) having a remaining liquid rate of 1/12. The resulting solid catalyst component (A) included 2.7 g of propylene polymer per 1 g of (A*) component.

(3) Preparation of Propylene-ethylene Block Copolymer

Figure 2A:
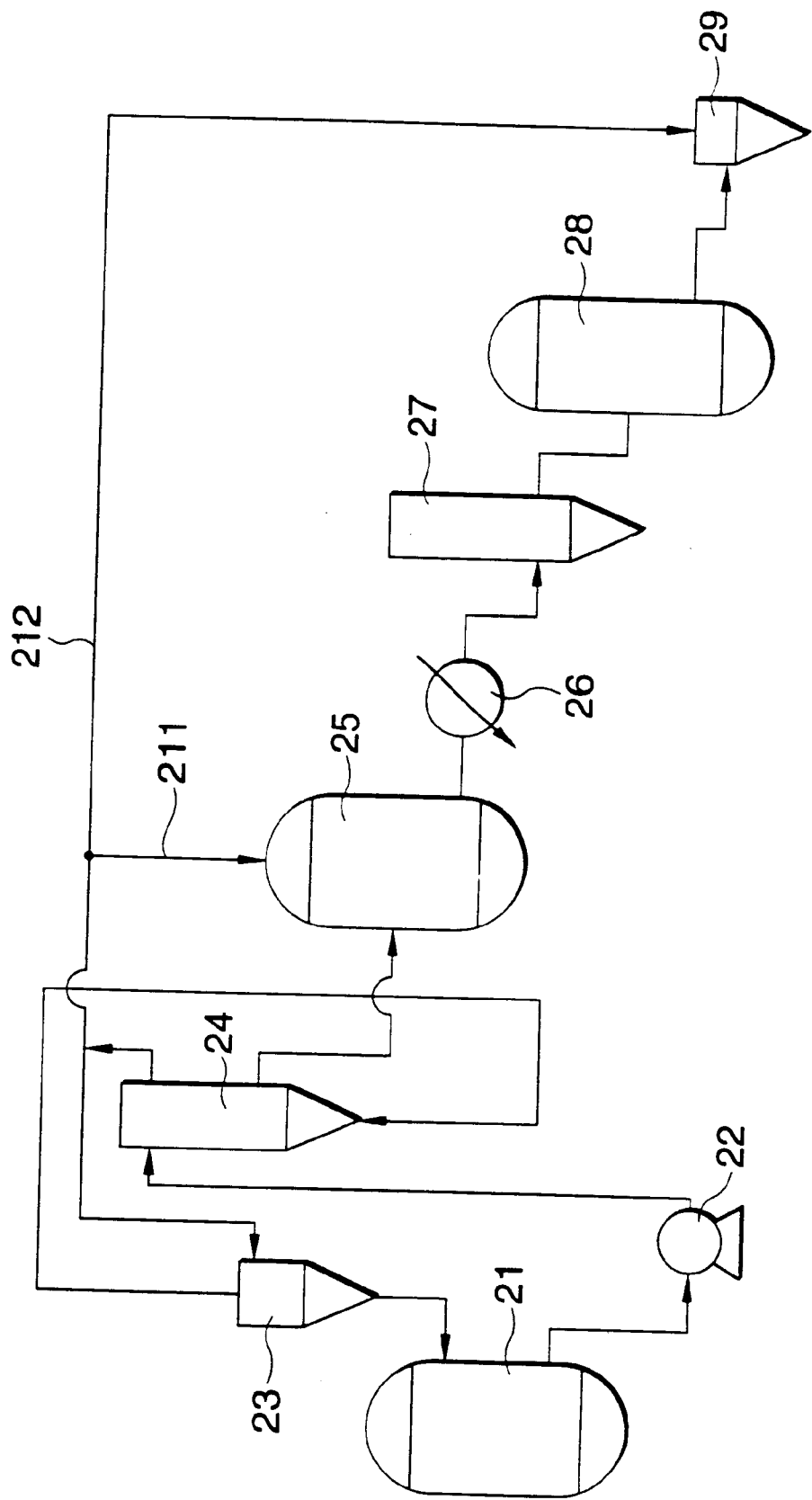
FIG. 2(a) is a flow diagram showing third embodiment of the present invention.
Figure 2B:
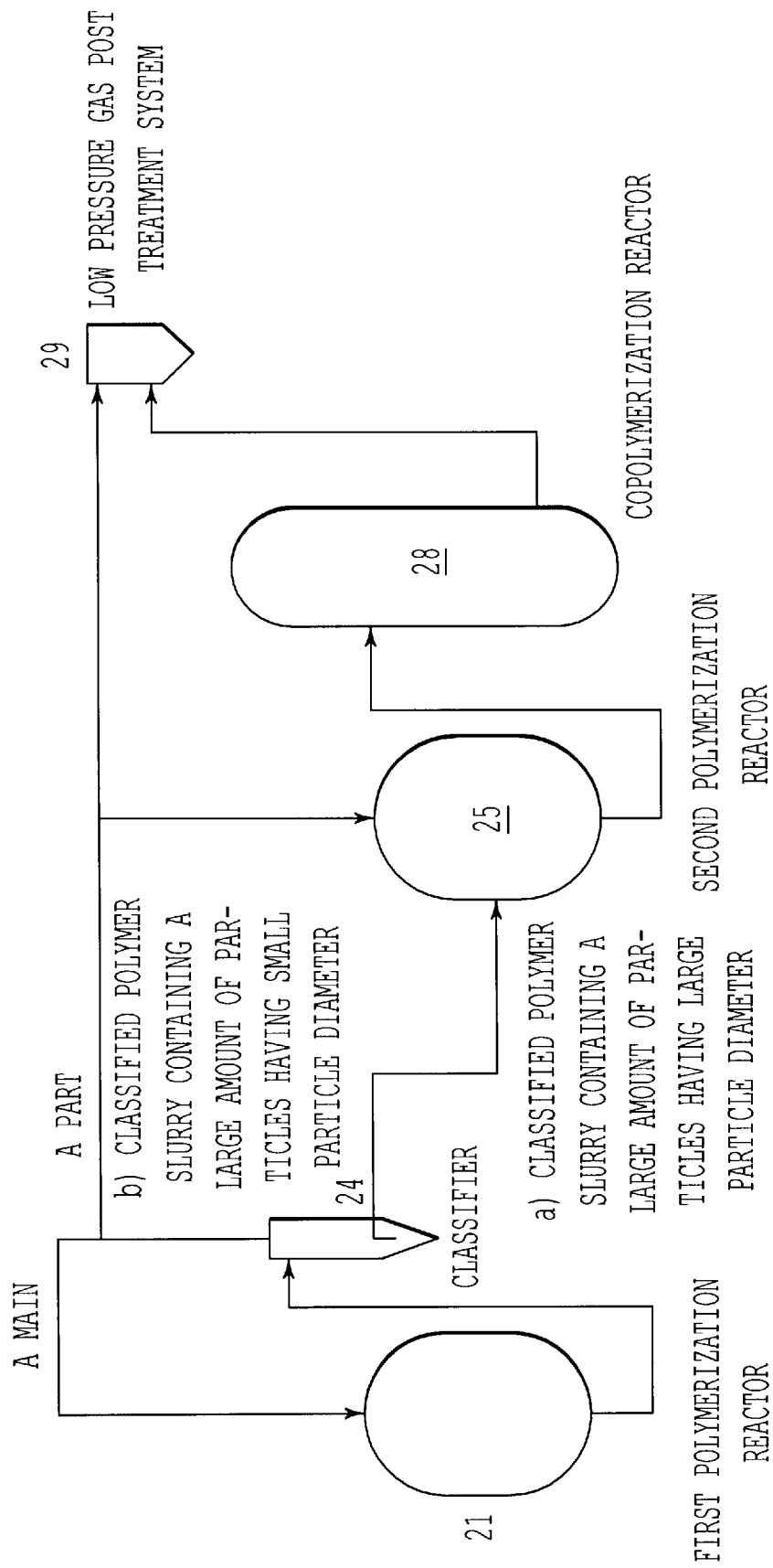
FIG. 2(b) is a flow diagram showing a polymerization process with a first and second polymerization reactor that may be separated by a classifier.

Three-reactor continuous polymerization was effected according to the process shown in FIG. 2, using the solid catalyst component prepared in (1), trlethylaluminum as a co-catalyst, and t-BuEtSi(OEt)$_2$ as a third component, in the presence of hydrogen. The concentration of triethylamine was 60 mol ppm to that of propylene, and the concentration of Si was 2.8 mol ppm to that of propylene.

Polymerization temperature and polymerization it pressure were as follows.

Polymerization temperature: in the propylene first polymerization reactor, polymerization temperature=75° C., polymerization pressure=37.0 atm, H$_2$ concentration=13 mol % to propylene; in the propylene second polymerization reactor, polymerization temperature=75° C., polymerization pressure=36.8 atm, H$_2$ concentration=12 mol % to propylene; in the gaseous phase polymerization reactor, polymerization temperature=80° C., polymerization pressure=16.0 atm, H$_2$ concentration=0.7 mol % to (ethylene+propylene), propylene/(propylene+ethylene)–55 mol %. Respective polymerization times in the propylene polymerization reactor 21 and the propylene polymerization reactor 25 were controlled to give a homopolymerization average CE of 50000 g/g and a ratio of a polymerized amount of the polymerization reactor 21 and that of the polymerization reactor 25 of 55:45 (weight ratio).

The slurry polymerized in the polymerization reactor 21 was fed to the precipitating liquid classifier 24 by means of a slurry pump 22.

The slurry discharged from the upper part of the precipitating liquid classifier 24 included fine particles and, therefore, the slurry was sent to the condenser 23, then circulated to the initial propylene polymerization reactor 21 from the lower part of the condenser. From the Hi upper part of the condenser 23, supernatant substantially free from solid particles was discharged and fed to the precipitating liquid classifier 24 from the lower part thereof by means of a pump. From the lower part of the precipitating liquid classifier 24, a slurry including particles having a large particle diameter was discharged. The slurry was then fed to the propylene second polymerization reactor.

The slurry from the second polymerization reactor was fed to a fluid flashing tank 27 via a double pipe type heat exchanger 26 located downstream. The feeding rate of the propylene polymer in the slurry was adjusted to 55 kg/hr. The inside of the fluid flashing tank 27 was kept at 70° C. with feeding heated propylene gas from the lower part of the tank. The propylene particles obtained here were fed to a gaseous phase polymerization reactor 28 and copolymerization of propylene with ethylene was effected therein.

In order to enhance a mixing effect, in the gaseous phase polymerization reactor 28 equipped with an assisting stirring blade, a gas mixture comprising ethylene, propylene, hydrogen and nitrogen was forced to be circulated by a gas blower.

Further, as an active hydrogen compound, ethanol was fed, and the feeding amount of ethanol was 1.2 in terms of molar ratio to aluminum in triethylaluminum supplied together with polymer particles to the gaseous phase polymerization reactor.

A residence time in respective polymerization reactors was 25 minutes in the first polymerization reactor, 35 minutes in the second polymerization reactor, and 36 minutes in the third polymerization reactor.

The polymer particles discharged from the gaseous phase polymerization reactor 28 were analyzed. The results were; MFR=30.0 g/10 min., bulk density=0.50 g/cc, and EPR content=14.6% by weight, molecular weight of EPR= 800000 and gel in number=230/250cm$^3$.

(2) Evaluation of Physical Properties

Flexural modulus=14600 kg/cm$^2$, Izod=10.1 kg·cm/cm, surface impact strength=99 kg·cm.

Example 4

In Example 3, the homopolymer average CE was 50000 g/g, and the ratio of the polymerized amount in the first polymerization reactor 21 and that of the second polymerization reactor 25 was controlled to 80:20 (weight ratio).

Polymerization temperature and polymerization pressure were as follows.

Polymerization temperature: in the propylene first polymerization reactor, polymerization temperature=75° C., polymerization pressure=37.0 atm, H$_2$ concentration=13 mol % to propylene; in the propylene second polymerization reactor, polymerization temperature=75° C., polymerization pressure=36.8 atm, H$_2$ concentration–12 mol % to propylene; in the gaseous phase polymerization reactor, polymerization temperature=80° C., polymerization pressure=16.0 atm, H$_2$ concentration=0.7 mol % to (ethylene+propylene), propylene/(propylene+ethylene)=55 mol %.

A residence time in respective polymerization reactors was 45 minutes in the first polymerization reactor, 20 minutes in the second polymerization reactor, and 36 minutes in the third polymerization reactor.

The polymer particles discharged from the gaseous phase polymerization reactor 28 were analyzed. The results were; MFR=33.0 g/10 min., bulk density=0.48 g/cc, and EPR content=14.2% by weight, molecular weight of EPR= 820000 and gel in number 145/250cm$^3$.

(2) Evaluation of Physical Properties

Flexural modulus=14900 kg/cm$^2$, Izod=10.0 kg·cm/cm, surface impact strength=103 kg·cm.

Comparative Example 2

The process was the same as in Example 3, except that in FIG. 2, the slurry was directly fed to the fluid flashing tank 27 by bypassing the second polymerization reactor 25.

Polymerization temperature and polymerization pressure were as follows. Polymerization temperature: in the propylene polymerization reactor, polymerization temperature= 75° C., polymerization pressure=36.5 atm, H$_2$ concentration=12 mol % to propylene; in the gaseous phase polymerization reactor, polymerization temperature=80° C., polymerization pressure=16.0 atm, H$_2$ concentration 0.7 mol % to (ethylene+propylene), propylene/(propylene+ ethylene)=55 mol %. Further, as an active hydrogen compound, ethanol was fed in an amount of 1.1 in terms of a molar ratio to aluminum in triethylaluminum carried by polymer particles supplied to the gaseous phase polymerization reactor.

A residence time in respective polymerization reactors was 66 minutes in the propylene homopolymerization reactor and 36 minutes in the gaseous phase polymerization reactor. A catalytic efficiency of the homopolymer (propylene homopolymerization)=50,000, MFR=60 g/10 min., content of ethylene-propylene copolymer in the block copolymer=14.2 wt %, molecular weight=800,000, final MFR=32 g/10 min., ρB=0.48 g/cc, gel in number=630/ 250cm$^3$, flexural modulus=14,800 kg/cm$^2$, Izod=9.5 kg·cm/ cm, surface impact strength=67 kg·cm.

From the aspect of the general use of the same polymer, regarding a function of stiffness (FM) and impact strength (DDI), one having a higher DDI is more excellent at the same FM.

From the results of Example 3, Example 4 and Comparative Example 2, it can be seen that by using two propylene homopolymerization reactors and appropriately controlling a ratio of a polymerized amount in the first polymerization reactor 21 and that of the second polymerization reactor 25, can be obtained a polymer comprising a small number of gel and also having an improved balance between stiffness (FM) and impact strength (DDI, compared with the case where one propylene homopolymerization reactor is used, on the condition that the residence time in the gaseous phase polymerization reactor and the pressure condition are the same.

Example 5

(1) Preparation of Solid Catalyst Component (A)

To a 3 L-round four-necked flask equipped with a vacuum stirrer and a thermometer was charged 2.058 mol of Mg(OEt)$_2$. Then, Ti(OBu)$_4$ was charged in an amount of Ti(OBu)$_4$/Mg of the initially charged Mg(OEt)$_2$=0.60 (molar ratio). The resulting mixture was heated with stirring at a rate of 300 rpm.

After reacting at 150° C. for 1.5 hours, the reaction mixture obtained was cooled to 120° C., then a toluene solution of MeSi(OPh)$_3$ was added thereto in an amount of MeSi(OPh)$_3$/Mg of the initially charged Mg(OEt)$_2$=0.67 (molar ratio). After completion of the addition, the resulting mixture was reacted for 1 hour at the same temperature. After completion of the reaction, the reaction mixture was cooled to room temperature, then Si(OEt)$_4$ was added thereto in an amount of Si(OEt)$_4$/Mg of the initially charged Mg(OEt)$_2$=0.05 (molar ratio). Thus, a slurry of a catalytic product (a*) was obtained.

All amount of the slurry thus obtained was transferred to an induction stirring type 10 L-autoclave equipped with a jacket for cooling and heating, then diluted with toluene to provide such a concentration as [Mg]=0.60 mol/liter of toluene.

With stirring at 300 rpm, this slurry was cooled to −10C, then diethyl phthalate was added in an amount of diethyl phthalate/Mg of the initially charged Mg(OEt)$_2$=0.10 (molar ratio). Successively, TiCl$_4$ was dropwise added in an amount of TiCl$_4$/Mg of the initially charged Mg(OEt)$_2$=4.0 (molar ratio) for 1.2 hours to form a uniform solution. During this procedure, there occurred no such a phenomenon that the viscosity of the liquid increased to form gel.

The resulting uniform solution was heated to 15° C. at a rate of 0.5° C./min. and kept for 1 hour at that temperature. Successively, the heated solution was further heated to 50° C. at a rate of 0.5° C./min. and kept for 1 hour at 50° C. The solution obtained was further heated to 117° C. at a rate of 1.0° C./min. and treated for 1 hour at 117° C.

After completion of the treatment, heating and stirring were stopped and the supernatant was eliminated. Thereafter, the resulting product was washed with toluene so that the remaining liquid rate may be 1/55, whereby a solid slurry was obtained.

Next, an amount of toluene in the resulting solid slurry was arranged so as to provide TiCl$_4$ concentration of 2.0 mol/liter of toluene, then TiCl$_4$ was added at room temperature in an amount of TiCl$_4$/Mg of the initially charged Mg(OEt)$_2$=5.0 (molar ratio). With stirring at 300 rpm, this slurry was heated and reacted at 117° C. for 1 hour. After completion of the reaction, heating and stirring were stopped and the supernatant was eliminated. Thereafter, the resulting product was washed with toluene so that the remaining liquid rate may be 1/150, whereby a toluene slurry (A*) was obtained.

(2) Prepolymerization

The total amount of the solid slurry thus obtained was transferred to a reactor having an inner diameter of 660 mm and a body diameter of 770 mm, and equipped with a Pfoudler Type blade, then diluted with n-hexane to give a concentration of (A*) of 3 g/liter. With stirring this slurry at 300 rpm, triethyl aluminum was added thereto at 25° C. so that triethyl aluminum/(A*) may be 3.44 mmol/g. Further, L-butyl-n-propyldimethoxysilane was added to the resulting mixture so that t-butyl-n-propyldimethoxysilane/(A*) may be 1.44 mmol/g. After the completion of the addition, with successively stirring, the mixture obtained was kept at 25° C. for 30 minutes.

Then, propylene gas was fed to a liquid phase at a constant rate for 72 minutes. After stopping feeding of the propylene gas, washing with n-hexane was applied thereto by means of a settling washing method to obtain a slurry of a solid catalyst component (A) having a remaining liquid rate of 1/12. The resulting solid catalyst component (A) included 2.7 g of propylene polymer per 1 g of (A*) component.

(3) Preparation of Propylene-ethylene Block Copolymer

Figure 3A:
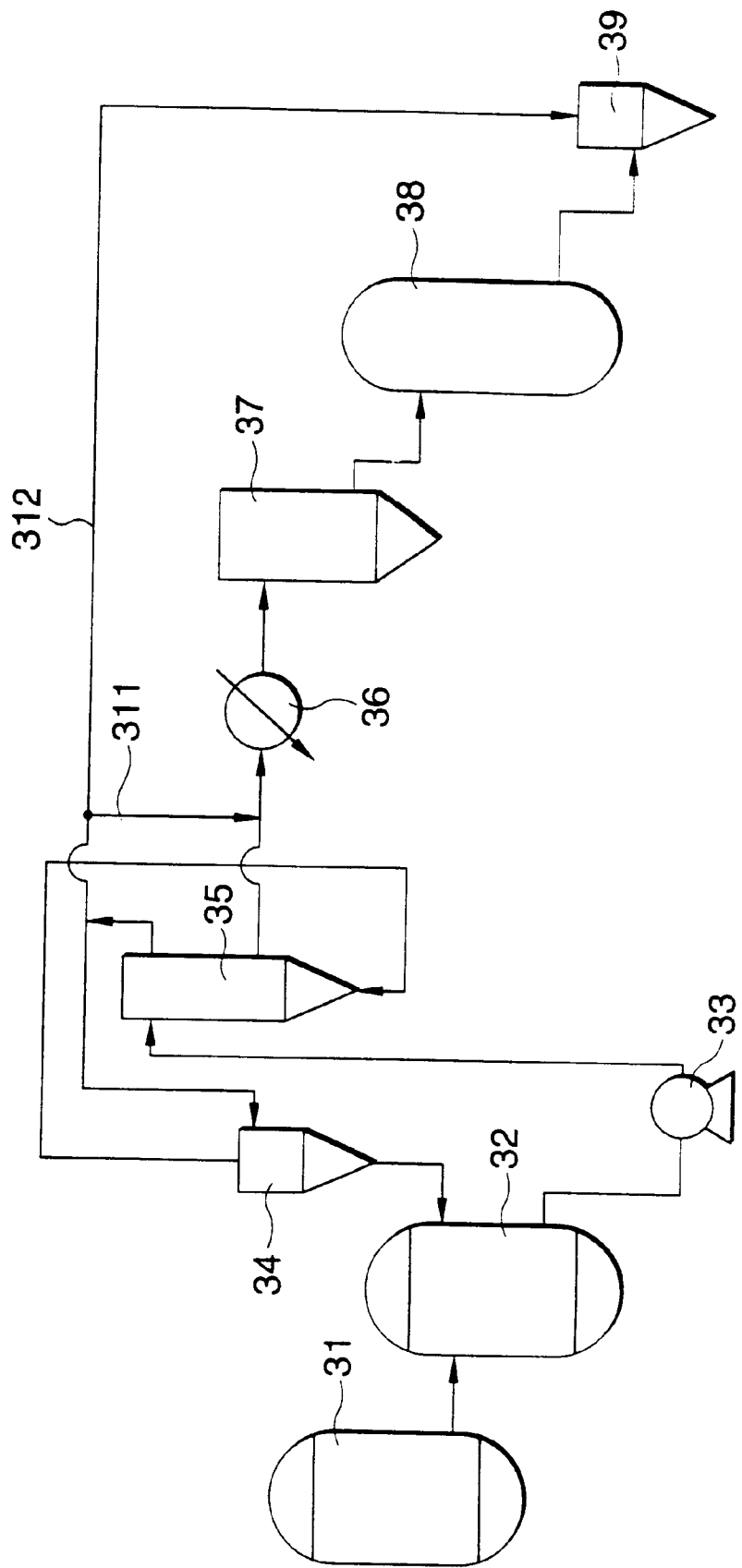
FIG. 3(a) is a flow diagram showing fourth embodiment of the present invention.
Figure 3B:
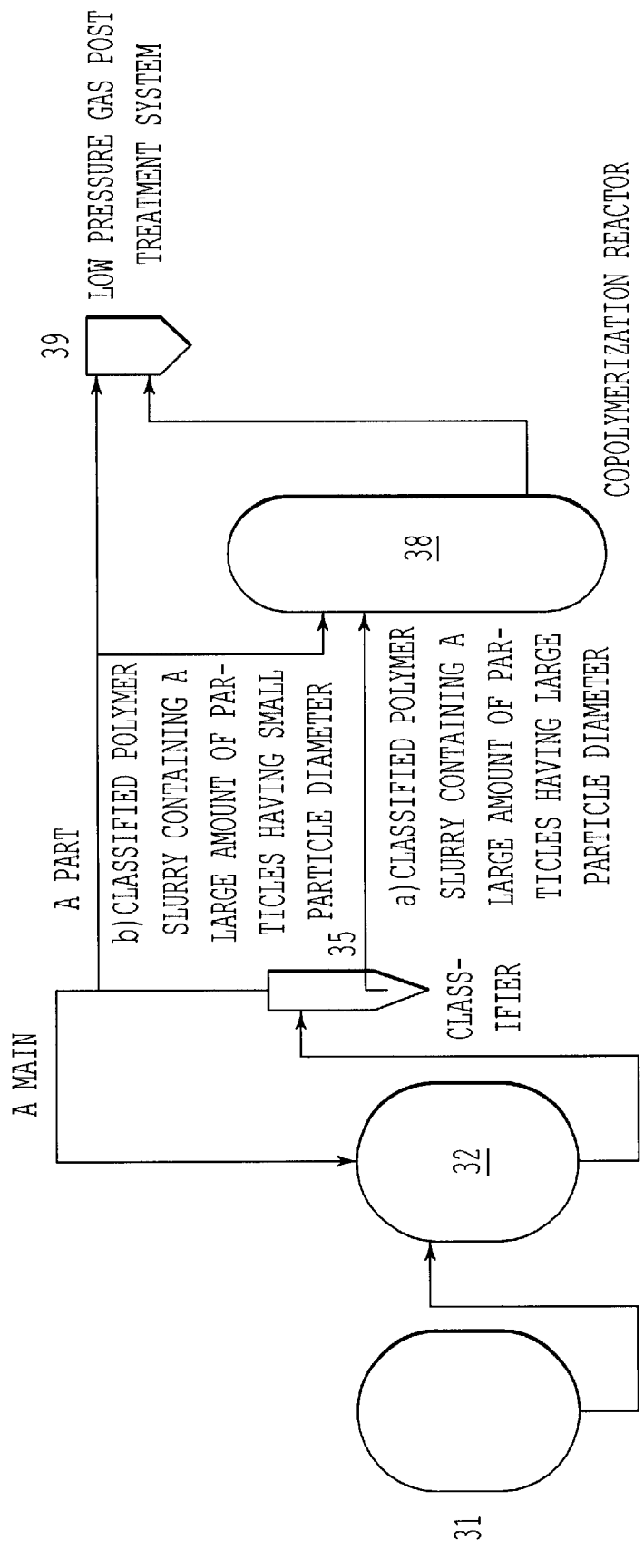
FIG. 3(b) is a flow diagram showing a polymerization process having a first and second polymerization reactor that may be separated from a copolymerization reactor by a classifier.

Three-reactor continuous polymerization was effected using the solid catalyst component prepared in (1), triethylaluminum as a co-catalyst, and t-BuEtSi(OEt)$_2$ as the third component, in the presence of hydrogen according to the process shown in FIG. 3. The concentration of triethylamine was 60 mol ppm to propylene, and the concentration of Si was 2.8 mol ppm to propylene.

Polymerization temperature and polymerization pressure were as follows.

Polymerization temperature: in the propylene first polymerization reactor, polymerization temperature=75° C., polymerization pressure=37.0 atm, $H_2$ concentration=13 mol % to propylene; in the propylene second polymerization reactor, polymerization temperature=75° C., polymerization pressure=70 atm, $H_2$ concentration=12 mol % to propylene; in the gaseous phase polymerization reactor, polymerization temperature=80° C., polymerization pressure=16.0 atm, $H_2$ concentration=0.7 mol % to (ethylene+propylene), propylene/(propylene+ethylene) 55 mol %.

Respective polymerization times in the first polymerization reactor 31 and the second polymerization reactor 32 were controlled to give a homopolymerization average CE of 50000 g/g and a polymerized amount ratio of the polymerization reactor 31 and the polymerization reactor 32 of 65:35 (weight ratio).

The slurry polymerized in the first polymerization reactor was directly fed to the second polymerization reactor, and the slurry polymerized in the second polymerization reactor was fed to the precipitating liquid classifier 35 by means of slurry pump 33.

The slurry discharged from the upper part of the precipitating liquid classifier 35 included fine particles and, therefore, it was sent to the condenser 34 and was then circulated to the initial second polymerization reactor 32 from the lower part of the condenser. From the upper part of the condenser 34, supernatant substantially free from solid particles was discharged and was fed to the precipitating liquid classifier 35 from the lower part thereof by means of a pump. From the lower part of the precipitating liquid classifier 35, a slurry including particles having a large particle size was discharged. The feeding rate of the slurry was controlled 55 kg/Hr in terms of polypropylene particles included in the slurry.

The slurry discharged from the lower part of the above-described precipitating liquid classifier 35 was fed to a fluid flashing tank 37 via a counter-current double pipe type heat exchanger 36. The inside of the fluid flashing tank 37 was kept at 70° C. with feeding heated propylene gas from the lower part of the tank. The solid propylene particles obtained here were fed to a gaseous phase polymerization reactor 38 and copolymerization of propylene with ethylene was effected therein.

In order to enhance a mixing effect, in the gaseous phase polymerization reactor 38 equipped with an assisting stirring blade, a gas mixture comprising ethylene, propylene, hydrogen and nitrogen was forced to be circulated by a gas blower.

Further, as an active hydrogen compound, ethanol is fed, and the feeding amount of ethanol was 1.2 in terms of molar ratio to aluminum in triethylaluminum supplied together with polymer particles to the gaseous phase polymerization reactor.

A residence time in respective polymerization reactors was 35 minutes in the first polymerization reactor, 35 minutes in the second polymerization reactor, and 36 minutes in the third polymerization reactor.

The polymer particles discharged from the gaseous phase polymerization reactor 38 were analyzed. The results were; MFR=31.0 g/10 min., bulk density=0.50 g/cc, and EPR content=14.4% by weight, molecular weight of EPR=800000 and gel in number=180/250cm$^3$.

(2) Evaluation of Physical Properties

Flexural modulus=14800 kg/cm$^2$, Izod=10.0 kg·cm/cm, surface impact strength=99 kg·cm.

Example 6

In Example 5, the homopolymer average CE was 50000 g/g, and the ratio of the polymerized amount in the first polymerization reactor 31 and that of the second polymerization reactor 32 was controlled to 40:60 (weight ratio).

Polymerization temperature and polymerization pressure were as follows. Polymerization temperature; in the propylene first polymerization reactor, polymerization temperature=75° C., polymerization pressure=37.5 atm, $H_2$ concentration=15 mol % to propylene; in the propylene second polymerization reactor, polymerization temperature=70° C., polymerization pressure=34.3 atm, $H_2$ concentration=12 mol % to propylene; in the gaseous phase polymerization reactor, polymerization temperature=80° C., polymerization pressure=16.0 atm, $H_2$ concentration=0.7 mol % to (ethylene+propylene), propylene/(propylene+ethylene)=55 mol %.

A residence time in respective polymerization reactors was 12 minutes in the first polymerization reactor, 60 minutes in the second polymerization reactor, and 36 minutes in the third polymerization reactor.

The polymer particles discharged from the gaseous phase polymerization reactor 38 were analyzed. The results were; MFR=27.0 g/10 min., bulk density=0.50 g/cc, and EPR content=14.8% by weight, molecular weight of EPR=820000 and gel in number=150/250cm$^3$.

(2) Evaluation of Physical Properties

Flexural modulus=14200 kg/cm$^2$, Izod=10.5 kg·cm/cm, surface impact strength=101 kg·cm Comparative Example 3

In FIG. 3, the same process as that of Example 5 was employed except that the first polymerization reactor 31 was not used and a catalyst supply was effected from the second polymerization reactor 32.

Polymerization temperature and polymerization pressure were as follows. Polymerization temperature: in the propylene polymerization reactor, polymerization temperature=75° C., polymerization pressure=37.0 atm, $H_2$ concentration=12 mol % to propylene; in the gaseous phase polymerization reactor, polymerization temperature=80° C., polymerization pressure=16.0 atm, $H_2$ concentration=0.7 mol % to (ethylene+propylene), propylene/(propylene+ethylene)=55 mol %.

Further, as an active hydrogen compound, ethanol was fed in an amount of 1.1 in terms of a molar ratio to aluminum in triethylaluminum carried by polymer particles supplied to the gaseous phase polymerization reactor.

A residence time in respective polymerization reactors was 66 minutes in the propylene homopolymerization reactor and 36 minutes in the gaseous phase polymerization reactor. A catalytic efficiency of the homopolymer (propylene homopolymerization)=50,000, MFR=60 g/10 min., content of ethylene-propylene copolymer in the block copolymer=14.2 wt %, molecular weight=800,000, final MFR=32 g/10 min., ρB=0.49 g/cc, gel in number 630/

250cm$^3$, flexural modulus=14,800 kg/cm$^2$, Izod=9.5 kg·cm/cm, surface impact strength=67 kg·cm From the results of Example 5, Example 6 and Comparative Example 3, it can be seen that by using two propylene homopolymerization reactors and appropriately controlling a ratio of a polymerized amount in the first polymerization reactor 31 and that of the second polymerization reactor 32, can be obtained a polymer having an improved balance between stiffness (FM) and impact strength (DDI), compared with the case where one propylene homopolymerization reactor is used, under the same gaseous polymerization conditions.

What is claimed is:

1. A process for continuously producing a propylene-based block copolymer, comprising:
    polymerizing an α-olefin comprising liquid propylene as a main component in the presence of hydrogen and a stereoregular polymerization catalyst in one or more polymerization reactors to obtain a polymer slurry;
    feeding said polymer slurry to a copolymerization reactor; and
    copolymerizing propylene and an α-olefin other than propylene substantially in a gaseous phase in the presence of said stereoregular polymerization catalyst, said polymer slurry and a deactivating compound in said copolymerization reactor to obtain a propylene-block copolymer powder;
    wherein said polymer slurry, discharged from one of said one or more polymerization reactors, is classified using a classification system to obtain a) a classified polymer slurry containing a large amount of particles having a large particle diameter and b) a classified polymer slurry containing a large amount of particles having a small particle diameter and a main part of said classified polymer slurry containing a large amount of particles having a small particle diameter is recycled to a final polymerization reactor of said one or more polymerization reactors;
    wherein a part of said classified polymer slurry containing a large amount of particles having a small particle diameter is transferred to a low pressure gas post treatment system; and
    wherein said classified polymer slurry containing a large amount of particles having a large particle diameter is transferred to said copolymerization reactor.

2. The process for continuously producing a propylene-based block copolymer as claimed in claim 1, wherein a part of the polymer slurry containing a large amount of particles having a small diameter is fed to said low pressure gas post treatment system and the copolymerization reactor.

3. A process for continuously producing a propylene-based block copolymer, comprising:
    polymerizing an α-olefin comprising liquid propylene as a main component in the presence of hydrogen and a stereoregular polymerization catalyst in two polymerization reactors to obtain a polymer slurry;
    feeding said polymer slurry to a copolymerization reactor; and
    copolymerizing propylene and an cc-olefin other than propylene substantially in a gaseous phase in the presence of said stereoregular polymerization catalyst, a deactivating compound and said polymer slurry in said copolymerization reactor to obtain a propylene block copolymer powder;
    wherein said polymer slurry discharged from a first polymerization reactor of said two polymerization reactors is classified using a classification system to obtain a) a classified polymer slurry containing a large amount of particles having a large particle diameter and b) a classified polymer slurry containing a large amount of particles having a small particle diameter;
    wherein said classified polymer slurry containing the large amount of particles having a large particle diameter is fed to a second polymerization reactor of said two polymerization reactors, while a main part of said classified polymer slurry containing said large amount of particles having a small particle diameter is recycled to said first polymerization reactor;
    wherein a part of the classified polymer slurry and containing a large amount of particles having a small particle diameter is fed to a low pressure gas post treatment system; and
    wherein said polymer slurry discharged from the second polymerization reactor of said two polymerization reactors is transferred to said copolymerization reactor.

4. The process for continuously producing a propylene-based block copolymer as claimed in claim 3, wherein a part of said classified polymer slurry discharged from the first polymerization reactor of said two polymerization rectors and containing a large amount of particles having a small diameter is transferred to a second polymerization reactor of said two polymerization reactors.

5. The process for continuously producing a propylene-based block copolymer as claimed in claim 3, wherein a ratio of an amount of polymer generated in said first polymerization reactor and the amount of polymer generated in said second polymerization reactor is 35/65 to 99/1.

6. A process for continuously producing a propylene-based block copolymer, comprising:
    polymerizing an α-olefin comprising liquid propylene as a main component in the presence of hydrogen and a stereoregular polymerization catalyst in two polymerization reactors to obtain a polymer slurry;
    feeding said polymer slurry to a copolymerization reactor;
    copolymerizing propylene and an α-olefin other than propylene substantially in a gaseous phase in the presence of said stereoregular polymerization catalyst, a deactivating compound and said polymer slurry in said copolymerization reactor to obtain a propylene-block copolymer powder;
    wherein a polymer slurry discharged from a first polymerization reactor of said two polymerization reactors is transferred to a second polymerization reactor of said two polymerization reactors;
    wherein a polymer slurry discharged from a second polymerization reactor of said two polymerization reactors is classified using a classification system including a classifier to obtain a) a classified polymer slurry containing a large amount of particles having a large particle diameter and b) a classified polymer slurry containing a large amount of particles having a small particle diameter;
    wherein said classified polymer slurry containing said large amount of particles having a large particle diameter is fed to the copolymerization reactor, while most part of the classified polymer slurry containing a large amount of particles having a small particle diameter is recycled to said second polymerization reactor; and wherein a part of the classified polymer slurry containing a large amount of particles having a small particle diameter is fed to a low pressure gas post treatment system.

7. The process for continuously producing a propylene-based block copolymer as claimed in claim 6, wherein a part of the classified polymer slurry, discharged from the second polymerization reactor and containing said large amount of particles having a small diameter is transferred to the copolymerization reactor.

8. The process for continuously producing a propylene-based block copolymer as claimed in claim 6, wherein a ratio of an amount of polymer generated in said first polymerization reactor and the amount of polymer generated in the second polymerization reactor is 15/85 to 85/15.

9. The process according to claim 1, wherein said classified polymer slurry a) contains particles having a particle diameter and said classified polymer slurry b) contains particles having a particle diameter which is smaller than the particle diameter of said particles of classified polymer slurry a).

* * * * *